United States Patent
Hecht et al.

(10) Patent No.: US 9,769,573 B2
(45) Date of Patent: *Sep. 19, 2017

(54) TRANSPARENT PARAMETRIC TRANSDUCER AND RELATED METHODS

(71) Applicant: Turtle Beach Corporation, San Diego, CA (US)

(72) Inventors: David S. Hecht, San Diego, CA (US); Brian Alan Kappus, San Diego, CA (US); Elwood Grant Norris, Poway, CA (US); Mark W. Norris, Poway, CA (US)

(73) Assignee: Turtle Beach Corporation, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/161,086

(22) Filed: May 20, 2016

(65) Prior Publication Data

US 2016/0373864 A1 Dec. 22, 2016

Related U.S. Application Data

(63) Continuation-in-part of application No. 14/604,565, filed on Jan. 23, 2015, now Pat. No. 9,351,083, which is a continuation-in-part of application No. 14/330,794, filed on Jul. 14, 2014, now Pat. No. 8,976,997, and a continuation-in-part of application No. 14/056,878, filed on Oct. 17, 2013, now Pat. No. 9,258,651.

(51) Int. Cl.
| | |
|---|---|
| *H04R 19/02* | (2006.01) |
| *H04R 1/02* | (2006.01) |
| *H04R 7/08* | (2006.01) |
| *H04M 1/02* | (2006.01) |
| *H04N 5/64* | (2006.01) |

(Continued)

(52) U.S. Cl.
CPC ............ *H04R 19/02* (2013.01); *G06F 1/1688* (2013.01); *H04M 1/0266* (2013.01); *H04N 5/642* (2013.01); *H04R 1/023* (2013.01); *H04R 1/028* (2013.01); *H04R 7/06* (2013.01); *H04R 7/08* (2013.01); *G02F 2001/133331* (2013.01); *G02F 2001/133394* (2013.01); *G06F 1/1626* (2013.01); *H04M 1/0268* (2013.01); *H04M 1/03* (2013.01); *H04N 5/60* (2013.01);

(Continued)

(58) Field of Classification Search
CPC ... H04R 2440/00–2440/07; H04R 9/00; H04R 7/04
USPC .......................................... 381/152, 396, 431
See application file for complete search history.

(56) References Cited

U.S. PATENT DOCUMENTS

| | | | |
|---|---|---|---|
| 6,427,017 B1 * | 7/2002 | Toki ...................... | B06B 1/0688 181/170 |
| 7,570,771 B2 * | 8/2009 | Whitwell ................. | H04R 1/24 381/152 |

(Continued)

OTHER PUBLICATIONS

International Search Report and Written Opinion for PCT/IB/1752985 dated Jul. 6, 2017, 7 pages.

*Primary Examiner* — Suhan Ni
(74) *Attorney, Agent, or Firm* — Sheppard Mullin; Daniel Yannuzzi; Jonathan Marina

(57) ABSTRACT

A transparent ultrasonic emitter includes a first transparent conductive layer; a second transparent conductive layer; and a plurality of transparent spacers disposed between the first and second transparent layers conductive of the ultrasonic audio speaker, the transparent spacers having a thickness and being arranged to define an open area between the first and second transparent layers.

24 Claims, 18 Drawing Sheets

(51) Int. Cl.
*H04R 7/06* (2006.01)
*G06F 1/16* (2006.01)
*H04M 1/03* (2006.01)
*G02F 1/1333* (2006.01)
*H04N 5/60* (2006.01)

(52) U.S. Cl.
CPC ...... *H04R 2217/03* (2013.01); *H04R 2499/11* (2013.01); *H04R 2499/15* (2013.01)

(56) References Cited

U.S. PATENT DOCUMENTS

| | | | |
|---|---|---|---|
| 7,657,042 B2* | 2/2010 | Miyata | G02F 1/133 381/152 |
| 7,769,191 B2* | 8/2010 | Lee | H04R 1/26 381/152 |
| 8,666,106 B2* | 3/2014 | Konno | H04R 1/323 381/107 |
| 8,976,997 B1* | 3/2015 | Hecht | H04R 19/02 381/152 |
| 9,184,502 B2* | 11/2015 | Yang | H01Q 1/2266 |
| 2007/0229479 A1* | 10/2007 | Choo | G06F 3/0436 345/177 |
| 2009/0244027 A1* | 10/2009 | Yoshida | C08J 7/047 345/174 |
| 2010/0048254 A1* | 2/2010 | Jiang | H04M 1/0266 455/566 |
| 2013/0026504 A1* | 1/2013 | Marx | F21K 9/00 257/88 |

* cited by examiner

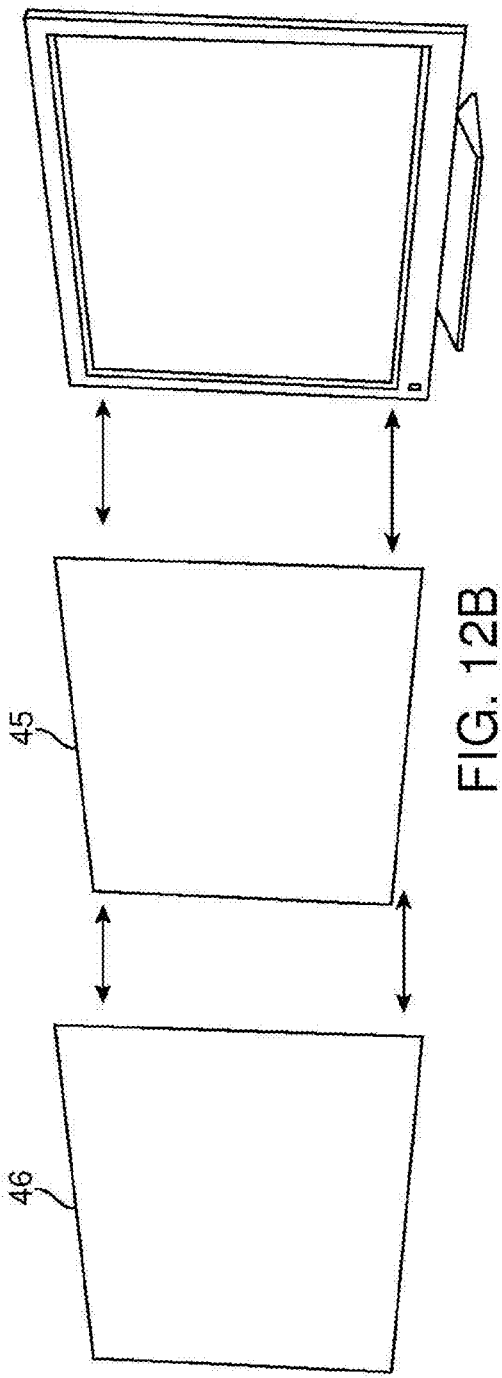
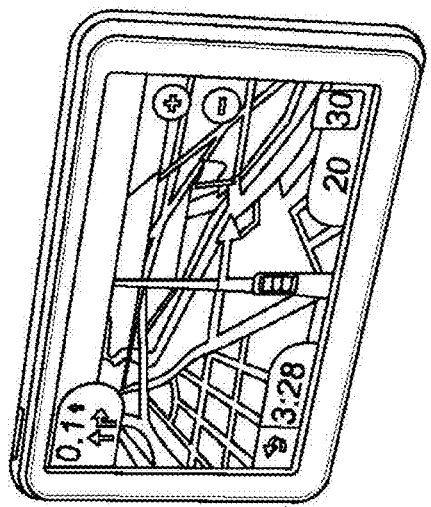
FIG. 12B
FIG. 12C

TRANSPARENT PARAMETRIC TRANSDUCER AND RELATED METHODS

CROSS-REFERENCE TO RELATED APPLICATIONS

This application is a continuation-in-part of and claims the benefit of U.S. Utility application Ser. No. 14/604,565 filed Jan. 23, 2015, titled Transparent Parametric Emitter, which issued as U.S. Pat. No. 9,351,083 on May 24, 2016, which is a continuation-in-part of and claims the benefit of U.S. Utility application Ser. No. 14/330,794 filed Jul. 14, 2014, titled Transparent Parametric Emitter, which issued as U.S. Pat. No. 8,976,997 on Mar. 10, 2015, and U.S. Utility application Ser. No. 14/056,878, filed Oct. 17, 2013, titled Transparent Parametric Transducer and Related Methods, which issued as U.S. Pat. No. 9,258,651 on Feb. 9, 2016, each of which are incorporated herein by reference in their entirety.

TECHNICAL FIELD

The present disclosure relates generally to parametric speakers. More particularly, some embodiments relate to a transparent ultrasonic emitter.

BACKGROUND OF THE INVENTION

Parametric sound is a fundamentally new class of audio, which relies on a non-linear mixing of an audio signal with an ultrasonic carrier. One of the key enablers for this technology is a high-amplitude, efficient ultrasonic source, which is referred to here as an emitter or transducer. Ultrasonic emitters can be created through a variety of different fundamental mechanisms, such as piezoelectric, electrostatic, and thermoacoustic, to name a few. Electrostatic emitters are generally capacitive devices consisting of two conductive faces with an air gap, where at least one of the conductive faces has a texture that is critical to the functionality of the emitter.

Non-linear transduction results from the introduction of sufficiently intense, audio-modulated ultrasonic signals into an air column. Self-demodulation, or down-conversion, occurs along the air column resulting in the production of an audible acoustic signal. This process occurs because of the known physical principle that when two sound waves with different frequencies are radiated simultaneously in the same medium, a modulated waveform including the sum and difference of the two frequencies is produced by the non-linear (parametric) interaction of the two sound waves. When the two original sound waves are ultrasonic waves and the difference between them is selected to be an audio frequency, an audible sound can be generated by the parametric interaction.

Parametric audio reproduction systems produce sound through the heterodyning of two acoustic signals in a non-linear process that occurs in a medium such as air. The acoustic signals are typically in the ultrasound frequency range. The non-linearity of the medium results in acoustic signals produced by the medium that are the sum and difference of the acoustic signals. Thus, two ultrasound signals that are separated in frequency can result in a difference tone that is within the 60 Hz to 20,000 Hz range of human hearing.

SUMMARY

Embodiments of the technology described herein include an ultrasonic audio speaker system, comprising an ultrasonic emitter. In various embodiments, the emitter is a transparent emitter configured with a sufficient degree of transparency so that it can be positioned over, or implemented as, a screen for a display of a content device. The transparent ultrasonic audio speaker in various embodiments includes an emitter and a driver.

In one embodiment, an ultrasonic audio speaker includes: a first transparent conductive layer; a second transparent conductive layer; and a plurality of transparent spacers disposed between the first and second transparent layers conductive of the ultrasonic audio speaker, the transparent spacers having a thickness and being arranged to define an open area between the first and second transparent layers.

In one embodiment, the first transparent conductive layer includes a first conductive layer adjacent a first nonconductive layer and the second transparent conductive layer includes a second conductive layer adjacent a second nonconductive layer. A hard coat layer may be included and disposed on the first transparent conductive layer.

The spacers may include a pattern of transparent structures disposed between the first and second transparent conductive layers, and may be of a dimension chosen to define a resonant frequency of the ultrasonic audio speaker. The spacers may include a plurality of transparent dots arranged in a pattern between the first and second transparent conductive layers. In other embodiments, the spacers may include a plurality of transparent ridges arranged in a pattern between the first and second transparent conductive layers. The transparent ridges may include a plurality of parallel ridges, a plurality of cross-wise ridges or a plurality of ridges arranged as concentric rings.

The ultrasonic audio speaker may have a resonant frequency, which may be defined by a volume of the open area between the first and second transparent layers and a thickness of the first transparent layer.

The ultrasonic audio speaker may be configured such that the first and second transparent layers and the transparent spacers as disposed between the two layers have a combined transmittance of greater than 80% in the visible spectrum. The ultrasonic audio speaker may be disposed on a display screen of a content device.

In yet another embodiment, an electronic content device, includes: a power supply; a content engine coupled to receive power from the power supply and to generate electrical signals representing audio content and electrical signals representing display content; a display coupled to the content engine and configured to receive the electrical signals representing display content and to generate a visual representation of the display content; and a transparent ultrasonic carrier audio emitter disposed on the display. The transparent ultrasonic carrier audio emitter may include: an ultrasonic audio speaker includes: a first transparent conductive layer; a second transparent conductive layer; and a plurality of transparent spacers disposed between the first and second transparent layers conductive of the ultrasonic audio speaker, the transparent spacers having a thickness and being arranged to define an open area between the first and second transparent layers.

The electronic content device a may also include a modulator coupled to receive the electrical signals representing audio content, and to modulate the received electrical signals onto and ultrasonic carrier; and a driver circuit having two inputs configured to be coupled to receive the audio content modulated onto an ultrasonic carrier signal, and two outputs, wherein a first output is coupled to the transparent conductor and the second output is coupled to the partially open transparent conductive layer.

The ultrasonic emitter may have a resonant frequency defined by spacing between the transparent layers and dimensions of the spacers.

The spacers may be of a dimension chosen to define a resonant frequency of the ultrasonic audio speaker.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the accompanying figures. The drawings are provided for purposes of illustration only and merely depict typical or example embodiments of the invention. These drawings are provided to facilitate the reader's understanding of the systems and methods described herein, and shall not be considered limiting of the breadth, scope, or applicability of the claimed invention.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 12B is a diagram illustrating an example of an emitter (e.g., emitter 6) applied to the screen of a flat screen television.

FIG. 12C is a diagram illustrating an example of an emitter (e.g., emitter 6) applied to the screen of a portable GPS device.

Figure 1:
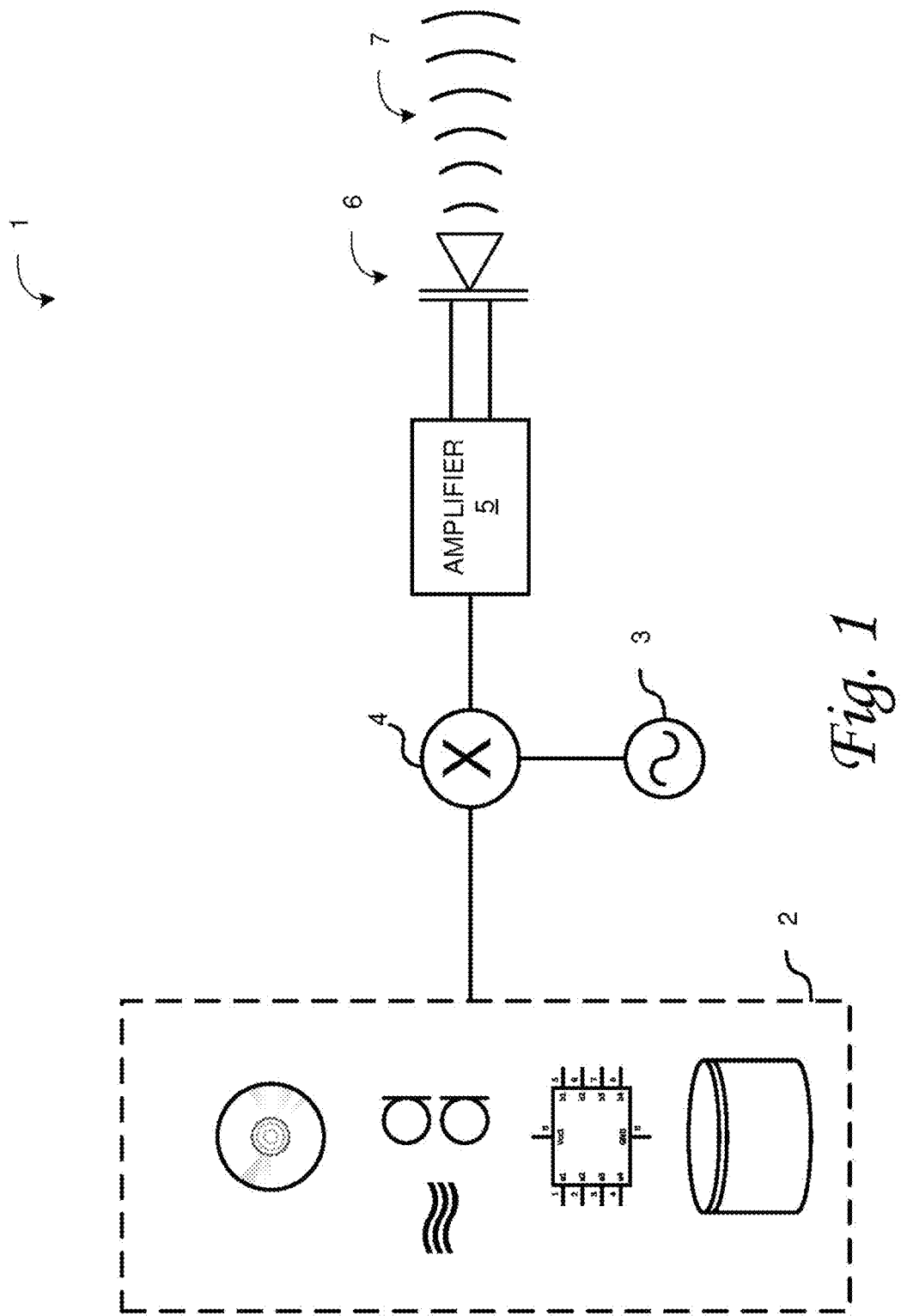
FIG. 1 is a diagram illustrating an ultrasonic sound system suitable for use with the emitter technology described herein.

The figures are not intended to be exhaustive or to limit the invention to the precise form disclosed. It should be understood that the invention can be practiced with modification and alteration, and that the invention be limited only by the claims and the equivalents thereof.

DESCRIPTION

Embodiments of the systems and methods described herein provide a HyperSonic Sound (HSS) audio system or other ultrasonic audio system for a variety of different applications. Certain embodiments provide an ultrasonic emitter for ultrasonic carrier audio applications. Preferably, the ultrasonic emitter is made using conductive layers or regions on glass or other transparent material, separated by a transparent insulating layer, so that the emitter has a high degree of transparency.

Accordingly, in some embodiments, the emitter is sufficiently transparent such that it can be positioned on or in front of the display screen of a content playback or display device to provide directional audio to a user of the device. In other embodiments, the emitter can be provided in place of the display screen of a content playback or display device. Content display devices such as, for example, laptops, tablet computers, computers and other computing devices, smartphones, televisions, PDAs, mobile devices, mp3 and video players, digital cameras, navigation systems, point-of-sale terminals and other content display devices are becoming smaller and lighter and are being designed with power saving features in mind.

Because of the shrinking size of such content devices, there is less room available in the device packaging to include audio speakers. Conventional audio speakers generally operate better with a resonating chamber, and also resonate at frequencies requiring a relatively large degree of movement from the speaker cone. Accordingly, sufficient space is required in the device packaging to accommodate such speakers. This can become particularly challenging with contemporary content devices in which displays, and hence the devices, are becoming increasing thin. Also contributing to this challenge is the fact that contemporary content devices are often designed such that the front face of the device is primarily occupied by the display screen, which is surrounded by only a small, decorative border. Thus, it has become increasingly more difficult to achieve desired audio output with conventional acoustic audio speakers given these dimensional constraints. Moreover, conventional acoustic audio speakers tend to not be highly directional. Therefore, it is difficult to 'direct' conventional audio signals exclusively to an intended listener location.

Therefore, in some embodiments, one or more transparent parametric emitters are disposed on the face of the device to allow parametric audio content to be provided to the device user(s). Further, in some embodiments, a transparent emitter can be positioned over part or all of the content device's display. In still further embodiments, a transparent emitter can be provided and used as (e.g., in place of) the display's protective cover (i.e., glass facing). Accordingly, in various embodiments, the transparent emitter is manufactured with materials providing sufficient light transmittance in the visible spectrum to allow satisfactory viewing by a user(s). For example, in some embodiments the light transmittance of the emitter in the visible spectrum is 50% or greater. In further embodiments, the light transmittance of the emitter in the visible spectrum is 60% or greater. In still further embodiments, the light transmittance of the emitter in the visible spectrum is 70% or greater. In still further embodiments, the light transmittance of the emitter in the visible spectrum is 80% or greater. As a further example, the light transmittance of the emitter in the visible spectrum is in the range of 70-90%. As yet another example, the light transmittance of the emitter in the visible spectrum is in the range of 75-85%. As still another example, the light transmittance of the emitter in the visible spectrum is in the range of 80-95%.

FIG. 1 is a diagram illustrating an ultrasonic sound system suitable for use with the systems and methods described herein. In this exemplary ultrasonic audio system 1, audio content from an audio source 2, such as, for example, a microphone, memory, a data storage device, streaming media source, CD player, DVD player, content display device, or other audio source is received. The audio content may be decoded and converted from digital to analog form, depending on the source. The audio content received by the audio system 1 is modulated onto an ultrasonic carrier of frequency f1, using a modulator. The modulator typically includes a local oscillator 3 to generate the ultrasonic carrier signal, and multiplier 4 to multiply the audio signal by the carrier signal. The resultant signal is a double- or single-sideband signal with a carrier at frequency f1. In some embodiments, signal is a parametric ultrasonic wave or an HSS signal. In most cases, the modulation scheme used is amplitude modulation, or AM. AM can be achieved by multiplying the ultrasonic carrier by the information-carrying signal, which in this case is the audio signal. The spectrum of the modulated signal has two sidebands, an upper and a lower side band, which are generally symmetric with respect to the carrier frequency, and the carrier itself.

The modulated ultrasonic signal is provided to the emitter or transducer 6, which launches the ultrasonic wave into the air creating ultrasonic wave 7. When played back through the transducer at a sufficiently high sound pressure level, due to nonlinear behavior of the air through which it is 'played' or transmitted, the carrier in the signal mixes with the sideband(s) to demodulate the signal and reproduce the audio content. This is sometimes referred to as self-demodulation. Thus, even for single-sideband implementations, the carrier is included with the launched signal so that self-demodulation can take place. Although the system illustrated in FIG. 1 uses a single transducer to launch a single channel of audio content, one of ordinary skill in the art after reading this description will understand how multiple mixers, amplifiers and transducers can be used to transmit multiple channels of audio using ultrasonic carriers.

Figure 2:
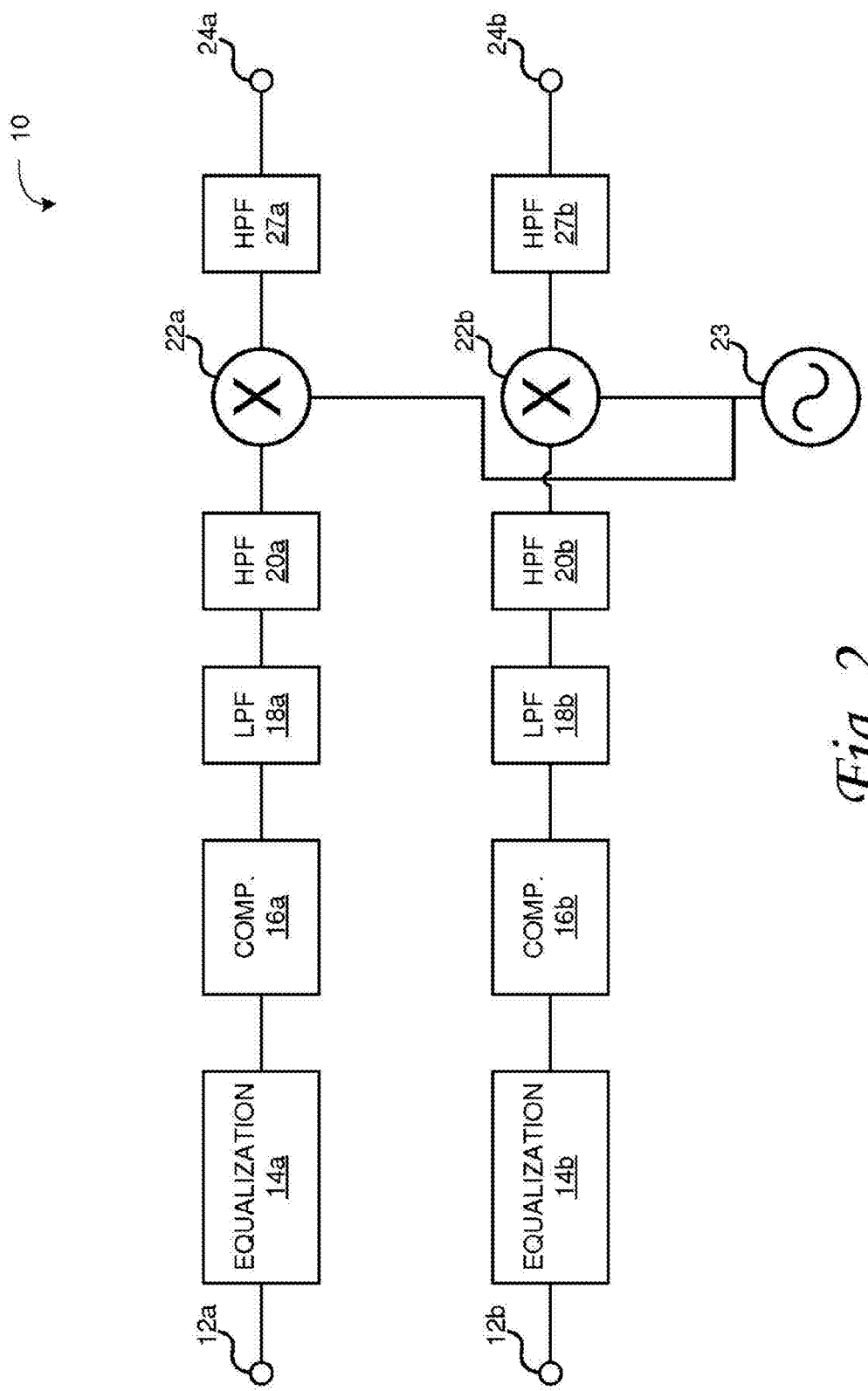
FIG. 2 is a diagram illustrating another example of a signal processing system that is suitable for use with the emitter technology described herein.

One example of a signal processing system 10 that is suitable for use with the technology described herein is illustrated schematically in FIG. 2. In this embodiment, various processing circuits or components are illustrated in the order (relative to the processing path of the signal) in which they are arranged according to one implementation. It is to be understood that the components of the processing circuit can vary, as can the order in which the input signal is processed by each circuit or component. Also, depending upon the embodiment, the signal processing system 10 can include more or fewer components or circuits than those shown.

The example shown in FIG. 1 is optimized for use in processing two input and output channels (e.g., a "stereo" signal), with various components or circuits including substantially matching components for each channel of the signal. It will be understood by one of ordinary skill in the art after reading this description that the audio system 1 can be implemented using a single channel (e.g., a "monaural" or "mono" signal), two channels (e.g., "stereo") (as illustrated in FIG. 2), or a greater number of channels.

Referring now to FIG. 2, the example signal processing system 10 can include audio inputs that can correspond to left 12a and right 12b channels of an audio input signal. Equalizing networks 14a, 14b can be included to provide equalization of the signal. The equalization networks can, for example, boost or suppress predetermined frequencies or frequency ranges to increase the benefit provided naturally by the emitter/inductor combination of the parametric emitter assembly.

After the audio signals are equalized, compressor circuits 16a, 16b can be included to compress the dynamic range of the incoming signal, effectively raising the amplitude of certain portions of the incoming signals and lowering the amplitude of certain other portions of the incoming signals. More particularly, compressor circuits 16a, 16b can be included to narrow the range of audio amplitudes. In one aspect, the compressors lessen the peak-to-peak amplitude of the input signals by a ratio of not less than about 2:1. Adjusting the input signals to a narrower range of amplitude can be done to minimize distortion, which is characteristic of the limited dynamic range of this class of modulation systems. In other embodiments, the equalizing networks 14a, 14b can be provided after compressor circuits 16a, 16b, to equalize the signals after compression.

Low pass filter circuits 18a, 18b can be included to provide a cutoff of high portions of the signal, and high pass filter circuits 20a, 20b providing a cutoff of low portions of the audio signals. In one exemplary embodiment, low pass filter circuits 18a, 18b are used to cut signals higher than about 15-20 kHz, and high pass filter circuits 20a, 20b are used to cut signals lower than about 20-200 Hz.

The high pass filter circuits 20a, 20b can be configured to eliminate low frequencies that, after modulation, would result in deviation of carrier frequency (e.g., those portions of the modulated signal that are closest to the carrier frequency). Also, some low frequencies are difficult for the system to reproduce efficiently and as a result, much energy can be wasted trying to reproduce these frequencies. Therefore, high pass filter circuits 20a, 20b can be configured to cut out these frequencies.

Low pass filter circuits 18a, 18b can be configured to eliminate higher frequencies that, after modulation, could result in the creation of an audible beat signal with the carrier. By way of example, if a low pass filter cuts frequencies above 15 kHz, and the carrier frequency is approximately 44 kHz, the difference signal will not be lower than around 29 kHz, which is still outside of the audible range for humans. However, if frequencies as high as 25 kHz were allowed to pass the filter circuit, the difference signal generated could be in the range of 19 kHz, which is within the range of human hearing.

In the example signal processing system 10, after passing through the low pass and high pass filters, the audio signals are modulated by modulators 22a, 22b. Modulators 22a, 22b, mix or combine the audio signals with a carrier signal generated by oscillator 23. For example, in some embodiments a single oscillator (which in one embodiment is driven at a selected frequency of 40 kHz to 50 kHz, which range corresponds to readily available crystals that can be used in the oscillator) is used to drive both modulators 22a, 22b. By utilizing a single oscillator for multiple modulators, an identical carrier frequency is provided to multiple channels being output at 24a, 24b from the modulators. Using the same carrier frequency for each channel lessens the risk that any audible beat frequencies may occur.

High-pass filters 27a, 27b can also be included after the modulation stage. High-pass filters 27a, 27b can be used to pass the modulated ultrasonic carrier signal and ensure that no audio frequencies enter the amplifier via outputs 24a, 24b. Accordingly, in some embodiments, high-pass filters 27a, 27b can be configured to filter out signals below about 25 kHz. Also, in various embodiments, error correction may be employed to reduce or cancel out distortion that may arise in transmission of the ultrasonic signal through the medium to the listener.

Figure 3A:
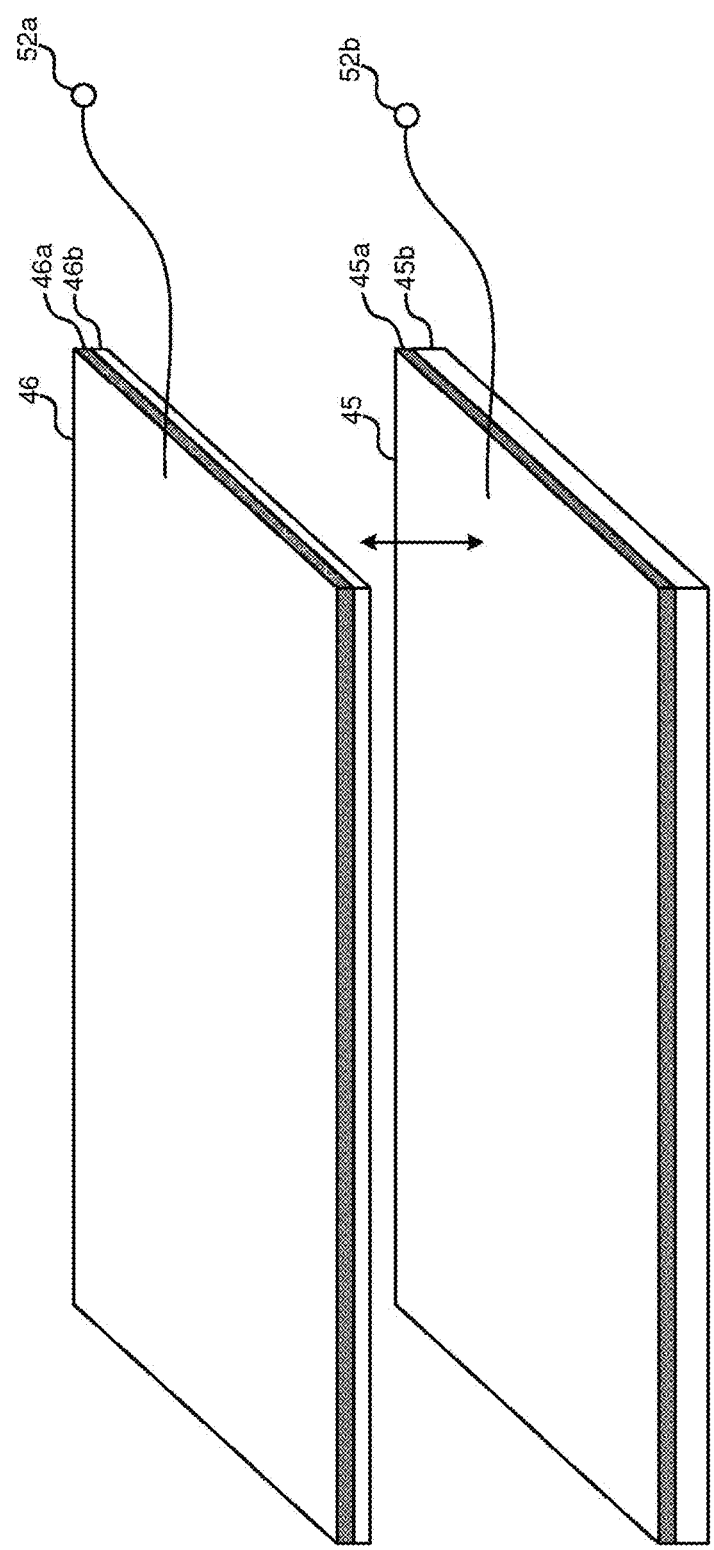
FIG. 3A is an exploded view diagram illustrating an example emitter in accordance with one embodiment of the technology described herein.
Figure 3B:
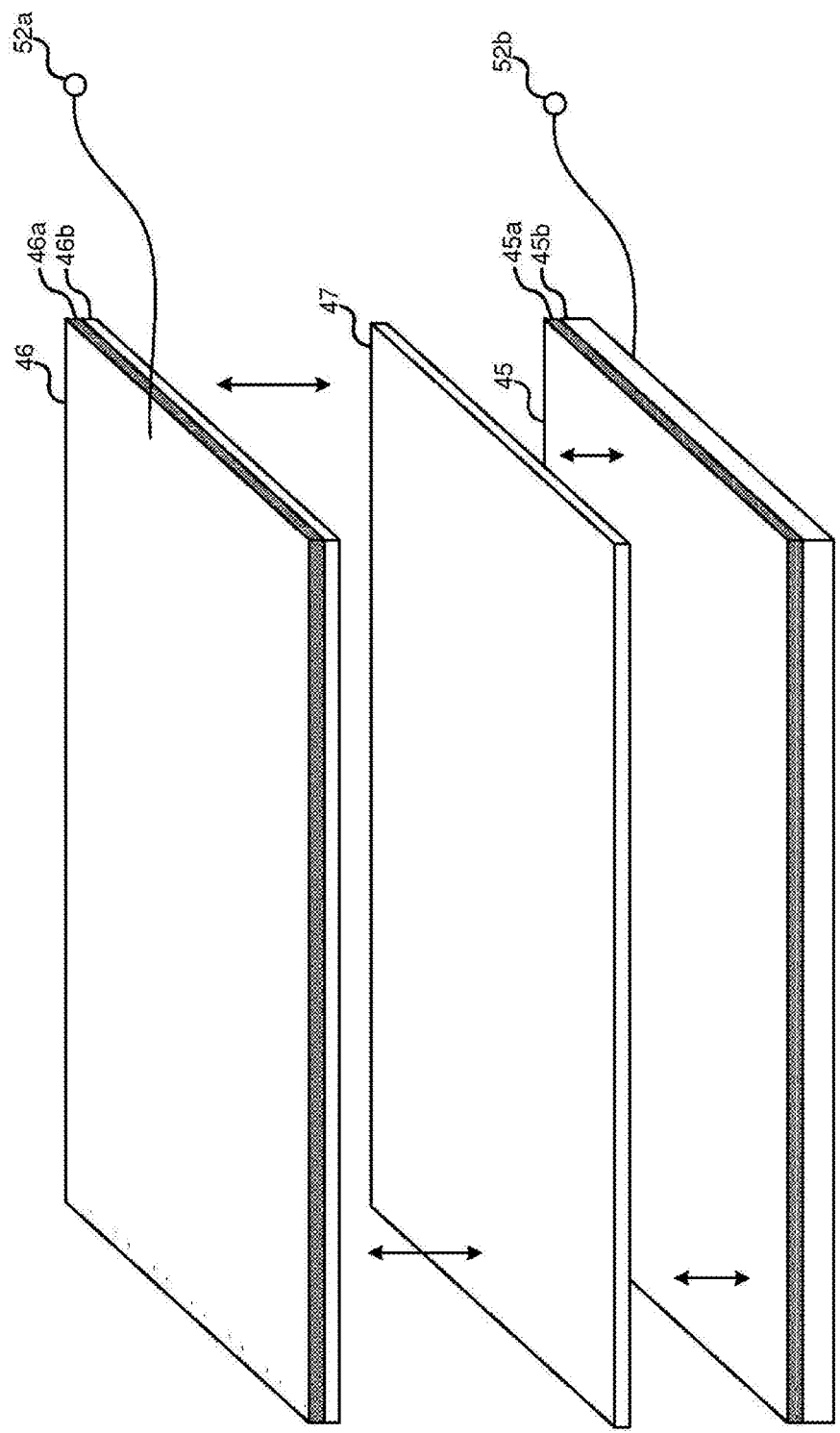
FIG. 3B is an exploded view diagram illustrating an example emitter in accordance with one embodiment of the technology described herein.

FIG. 3A is an exploded view diagram illustrating an example emitter in accordance with one embodiment of the technology described herein. The example emitter shown in FIG. 3 includes sheets 45 and 46, which in various embodiments are transparent sheets. Although sheets 45, 46 can be transparent, non-transparent materials can be used as well. For ease of discussion, the emitter configurations are described herein from time to time as transparent emitters. However, one of ordinary skill in the art will understand that for various applications, opaque emitters or emitters with varying levels of opacity can be provided as well. In such alternative embodiments, one or more of the sheets of the emitter can be made with opaque or semi-opaque materials.

Sheets 45, 46 in the illustrated example, each include two layers 45a, 45b and 46a, 46b, respectively. Sheet 45 in this example, includes a base layer 45b comprising glass or other like material. Sheet 45 also includes a conductive layer 45a provided in the illustrated example on the top surface of base layer 45b. Similarly, in this example, sheet 46 includes a base layer 46b comprising glass or other like material, and a conductive layer 46a provided in the illustrated example on the top surface of base layer 46b. Conductive layers 45a, 46a are illustrated with shading on the visible edges to better contrast the conductive regions and the nonconductive regions. Although some embodiments may use shaded or tinted materials, the shading in the drawings is done for illustrative purposes only.

The conductive layers 45a, 46a can be a thin layer of conductive material deposited on their respective base layers 45b, 46b. For example, conductive layers 45a, 46a can comprise a conductive coating sprayed, evaporated, or otherwise deposited on base layers 45b, 46b. As a further example, the conductive layers 45a, 46a can comprise Indium Tin Oxide (ITO), Fluorine doped Tin Oxide (FTO), doped zinc oxide, transparent gold, so-called hybrid transparent conductive coatings, conductive polymers, metal oxides or other like conductive material coated onto the transparent substrate. Conductive layers 45a, 46a can also comprise a layer of carbon nanotube networks or Graphene or a combination thereof disposed on the transparent sheet.

Conductive layers 45a, 46a can also comprise a conductive sheet of material laminated or otherwise deposited on base layers 45b, 46b. For example, a conductive mylar or other like film can be laminated or otherwise deposited on base layers 45b, 46b. In still further embodiments, conductive layers 45a, 46a can comprise a doped conduction layer or diffusion layer of conductive material that has been diffused partially or completely into sheets 45, 46 to form conductive layers 45a, 46a. For example, gold or other conductive metals can be diffused into the glass to a desired depth and at a desired concentration to provide conductivity to a desired value (e.g. a desired value of ohms/square). Preferably, the conductive region/layer 45a, 46a has a high degree of transparency (e.g., greater than 80% or 90% in the visible spectrum, although other transparencies can be used) so as not to unduly adversely affect the overall transparency of the emitter.

Accordingly, sheets 45 and 46 comprise base layers 45b, 46b each with a conductive layer 45a, 46a having a low electrical resistance. For example, in one embodiment, the resistance of each conductive layer 45a, 46a can be 100 ohms/square or less. In other embodiments, the resistance of each conductive layer 45a, 46a can be 50 ohms/square or less. In further embodiments, the resistance of each conductive layer 45a, 46a can be 10 ohms/square or less. In still other embodiments, the resistance of each conductive layer 45a, 46a can be 150 ohms/square or less. In yet other embodiments, the resistances of conductive layers 45a, 46a can have other values, and the resistance of conductive layers 45a, 46a need not be equal to one another.

In some embodiments, sheets 45, 46 are implemented using a high-ion-exchange (HIE) alkali-aluminosilicate thin-sheet glass. More particularly, in some embodiments, sheets 45, 46 comprise a sheet of Corning® Gorilla® Glass (available from Corning Incorporated, One Riverfront Plaza, Corning, N.Y. 14831 USA), or other like material. In other embodiments, sheets 45, 46 are implemented using Corning® Willow™ Glass, also available from Corning Incorporated, One Riverfront Plaza, Corning, N.Y. 14831 USA). For example, in one embodiment, sheet 46 is made of Willow Glass and sheet 45 is made of a thicker, more rigid Gorilla Glass. As described elsewhere herein, and as would be apparent to one of ordinary skill in the art after reading this description, other transparent materials can be used for sheets 45 and 46.

Although sheets 45, 46 or their respective base layers 45b, 46b are described above as comprising glass sheets, other transparent materials can be used for transparent base layers 45b, 46b. For example, polycarbonates, acrylics, Plexiglas, plastics or other like materials can be used. In some embodiments, metallized films with a sufficiently light-transmitting metallic coating so as to provide transparency without adversely affecting viewing of content through the emitter can be used to provide the conductive sheets 45 and/or 46.

For example, in one embodiment, a glass or other rigid material can be used for sheet 45 (e.g., to form a rigid backplate for the emitter) and a metallized film can be used for sheet 46. Accordingly, metallized films such as, for example, Mylar and Kapton® can be used as either or both sheets 45 and 46.

In some embodiments, sheet 45 can be of a thickness in the range of about 2 mm-10 mm and sheet 46 can be of a thickness in the range of about 0.05 mm-0.5 mm, although other thicknesses are permitted. For example, in some embodiments, layer 46 is 0.25 mils in thickness and sheet 45 is 20 mils in thickness. A thinner, lower resistance layer between conductive layers 45a, 46a allows operation of the emitter with a lower amount of bias voltage.

In operation, one layer vibrates in response to the electrical signal provided across the layers, launching the modulated ultrasonic signal into the transmission medium (e.g., into the air). Assume, for example, in some embodiments that the emitter is configured such that layer 46 is positioned toward the face of the emitter and vibrates in response to the electrical signal, and sheet 45 is toward the back of the emitter. In some embodiments, sheet 45 may be provided with sufficient thickness to impart a desired amount of rigidity and strength to the emitter. Accordingly, in some embodiments, sheet 45 may be of greater thickness than layer 46. In fact, in various embodiments, layer 46 is provided thin enough to allow it to oscillate and launch the modulated ultrasonic carrier into the air.

In various embodiments, conductive layers 45a, 46a may be much thinner than base layers 45b, 46b. However, for ease of illustration, the dimensions (including the relative thicknesses) of the various layers 45a, 45b, 46a, 46b are not drawn to scale.

Where sheets 45, 46 include a conductive layer 45a, 46a and a base layer 45b, 46b, the intermediate base layer between the two conductive layers (base layer 46b in the illustrated example) can serve as a resistive layer, electrically isolating conductive layer 46a from conductive layer 45a. In various embodiments, this intermediate base layer (46b in the illustrated example) is of sufficient thickness to prevent arcing or shorting between conductive layers 45a, 46a. In further embodiments, this intermediate base layer (46b in the illustrated example) in series with an air gap provided between layers 45 and 46, is of sufficient resistance to prevent arcing or shorting between conductive layers 45a, 46a.

In various embodiments, a separate insulating layer 47 (shown in FIGS. 3B, 3C) can be included to provide additional electrical isolation between layers 45 and 46. Insulating layer 47 can comprise a glass, plastic, or polymer layer or other high-optical-transmittance layer having relatively low conductivity to provide an insulating layer between sheets 45 and 46. For example, insulating layer 47 can have a very high or even a virtually infinite resistance. For applications where a thin emitter is desired, insulating layer 47 can be chosen to be as thin as possible or practical, while preventing electrical shorting or arcing between layers 45 and 46. Insulating layer 47 can be made, for example, using glass, polycarbonates, acrylics, plastics, PET, axially or biaxially-oriented polyethylene terephthalate, polypropylene, polyimide, or other insulative film or material. Preferably, insulating layer 47 has sufficiently high resistivity to prevent arcing between layers 45 and 46. Note that where the insulating properties of base layer 46b (in FIG. 3B) are sufficient, insulating layer 47 is not needed (i.e., the embodiment shown in FIG. 3A is sufficient).

Insulating layer 47 can be chosen to be as thin as possible or practical, while preventing electrical shorting or arcing between layers 45 and 46. Insulating layer 47 can be made, for example, using glass, polycarbonates, acrylics, plastics, PET, axially or biaxially-oriented polyethylene terephthalate, polypropylene, polyimide, or other insulative film or material. Preferably, insulating layer 47 has sufficiently high resistivity to prevent arcing between layers 45 and 46.

For applications where transparency is desired, high transmittance materials in the visible spectrum are preferred. For example, Gorilla Glass and Willow Glass have transmittances of approximately 90% or greater in the visible wavelengths. Materials with high transmittances are well suited for applications where the parametric emitter is affixed to, or used in place of, the display of a content device such as a laptop, tablet, smartphone, computer, television, mobile device, camera, portable GPS unit, or other content display device. Where a two-layer system is used with each layer having 90% or better transmittance, the emitter can be made having a total transmittance of approximately 81% or better. Additional applications are also described below.

Sheets 45 and 46 (and insulating layer 47, if included) can be joined together using a number of different techniques. For example, frames, clamps, clips, adhesives or other attachment mechanisms can be used to join the layers together. The layers can be joined together at the edges to avoid interfering with resonance of the emitter films. Preferably, sheets 45 and 46 (and insulating layer 47 when included) are held together in close, fixed relation to one another.

Spacers 49 (FIG. 4) can be included between layers 45, 46 (and 47, if included) to allow a gap between layers. In various embodiments, an air gap is provided between layer 46 and the next adjacent layer (45 or 47) to allow layer 46 to oscillate in response to the modulated carrier signal. Spacers 49 can be provided in various shapes and forms and can be positioned at various locations between the layers to provide support to maintain the air gap. For example, spacers can be dots or beads made from low-conductivity material such as, for example, glass, plastics, and so on. Spacers can also be made using silicone or other gels, fine dust or sand, transparent liquids or other transparent materials. In various embodiments, the contact area of the spacers 49 at layer 46 is maintained as a small contact area so as not to interfere with oscillation of layer 46. In various embodiments, the air gap can range from 0.1 to 20 mils. In some applications, layer 46 oscillates to a displacement of about 1 micron (0.03937 mils) in order to produce a sufficiently audible signal. Accordingly, the air gap in such embodiments is greater than 0.03937 mils to avoid having the base layer 45 (which may be rigid or mounted on a rigid surface) interfere with the oscillation of layer 46.

Although conductive sheets 45 and 46 can be the same thickness, in some embodiments, one of the conductive sheets (e.g., sheet 45) can be made of a thicker material to provide greater rigidity to the emitter. Because resonance will be affected by the thickness, this thicker sheet will typically be the sheet positioned away from the listener and form a transparent backing plate of the emitter. For example, conductive sheet 45 can be up to 125 mils in thickness, or thicker, thereby increasing the thickness and rigidity of the emitter.

In some embodiments, with a thicker layer serving as a backing plate, the emitter can replace the screen that might otherwise be present on the display of a content device. In such embodiments, for example, the emitter can be assembled and used to replace the glass (or other material)

cover of the content device. In other embodiments, the emitter can be added to the screen of the content device as an outer layer thereof.

Additionally, sheet 45 can be a smooth or substantially smooth surface, or it can be rough or pitted. For example, sheet 45 can be sanded, sand blasted, formed with pits or irregularities in the surface, deposited with a desired degree of 'orange peel' or otherwise provided with texture. This texture can provide effective spacing between sheets 45, 46, allowing sheet 46 to vibrate in response to the applied modulated carrier. This spacing can reduce the damping that might be caused by more continuous contact of sheet 45 with sheet 46. Also, as noted above, in some embodiments, spacers 49 (FIG. 4) can be provided to maintain a desired spacing between sheets 45 and 46. Small spacers 49 can be deposited or formed in the surface of sheet 45 that is adjacent to sheet 46 (or vice versa) to allow a gap to be maintained. Again, this spacing can allow sheet 45 to oscillate in response to the applied modulated carrier signal.

In various embodiments, a non-conductive backing plate (not illustrated) can also be provided. Non-conductive backing plate can also be transparent and can serve to insulate conductive sheet 45 on the back side of the emitter and provide a foundation by which the emitter can be positioned or mounted. For example, conductive sheet 45 can be deposited on a non-conductive, or relatively low conductivity, glass substrate. In another embodiment, conductive sheet 45 can be positioned on the screen of a content device.

In operation, sheets 45 and 46 provide opposite poles of the parametric emitter. In one embodiment (and in examples described above) sheet 46 is the active pole that oscillates in response to the application of the modulated carrier signal via contact 52a. To drive the emitter with enough power to get sufficient ultrasonic pressure level, arcing can occur where the spacing between conductive sheet 46 and conductive sheet 45 is too small. However, where the spacing is too large, the emitter won't achieve resonance. In some embodiments, the spacing is made as small as possible (e.g., the layers are placed as close as possible while avoiding arcing) and the thickness of the vibrating layer (e.g., layer 46) is adjusted to tune the resonant frequency of the emitter. Arranging layers 45 and 46 close to one another provides for a more efficient operation because, generally speaking, as the layers are placed closer together, less voltage is needed to drive the emitter.

If an insulating layer 47 is used, in some embodiments it is a layer of about 0.92 mil in thickness. In some embodiments, insulating layer 47 is a layer from about 0.90 to about 1 mil in thickness. In further embodiments, insulating layer 47 is a layer from about 0.75 to about 1.2 mil in thickness. In still further embodiments, insulating layer 47 is as thin as about 0.33 or 0.25 mil in thickness. Other thicknesses can be used, and in some embodiments, a separate insulating layer 47 is not provided. In some embodiments, insulating layer 47 can be provided with cutouts, holes or other apertures to provide the function of spacers 49. For instance, insulating layer 47 can comprise a sheet with a pattern of holes through the material. The remaining material between the holes can function as the spacers 49. The cutouts can be any shape and size, including circular, square, polygonal, and so on.

Figure 3C:
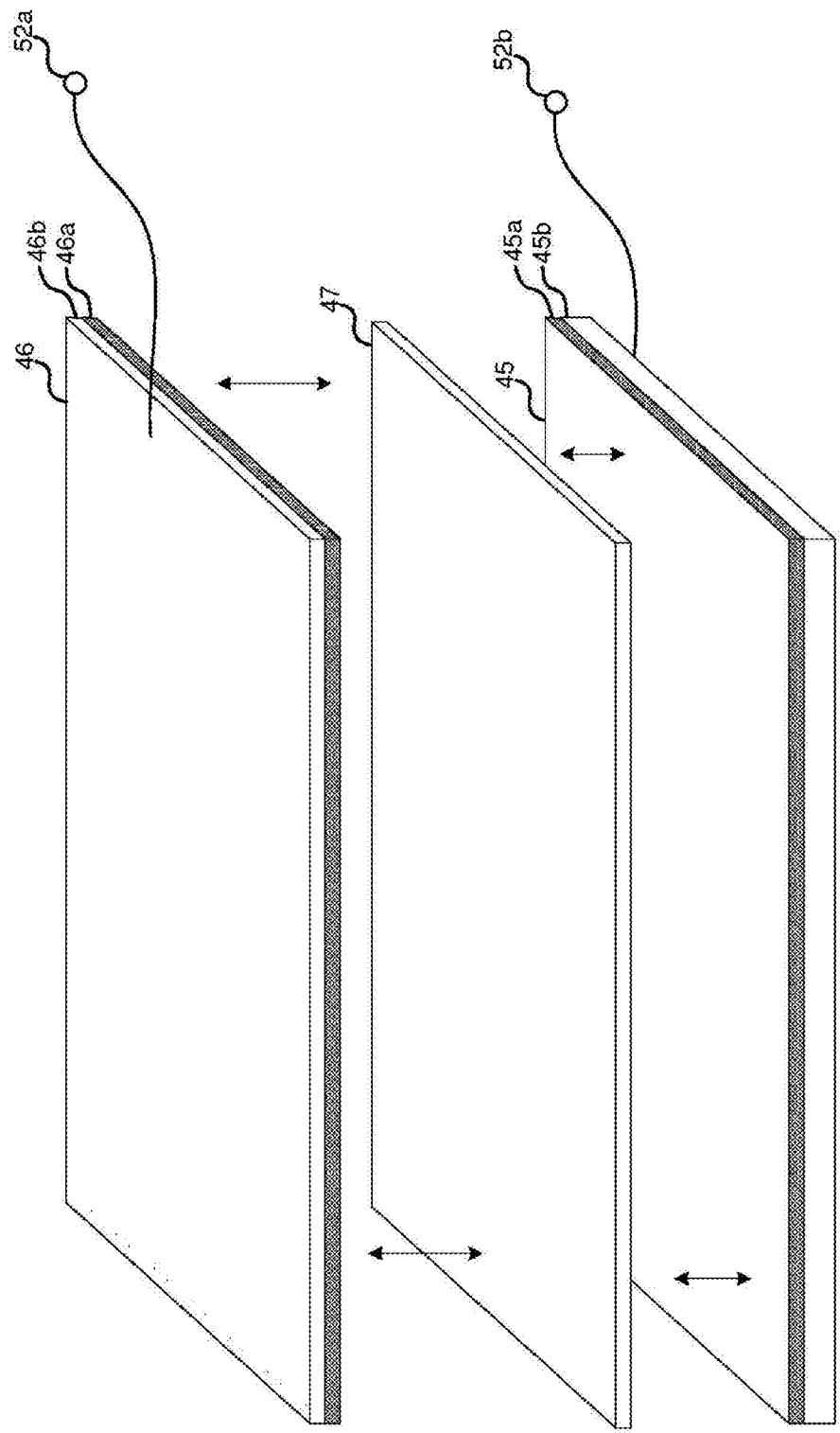
FIG. 3C is an exploded view diagram illustrating an example emitter in accordance with one embodiment of the technology described herein.

One benefit of including an insulating layer 47 is that it can allow a greater level of bias voltage to be applied across the first and second conductive surfaces of sheets 45, 46 without arcing. When considering the insulative properties of the materials between the two conductive surfaces of sheets 45, 46, one should consider the insulative value of insulating layer 47, if included as well as that of the air gap and of base layer 46b, if included.

Where an insulating layer 47 is included, or where the air gap is sufficiently large to prevent arcing, the conductive layers 45a, 46a of sheets 45, 46 can in various embodiments be positioned facing one another as illustrated in FIG. 3C. Also, in other embodiments, the insulating layer 47 can allow avoidance of nonconductive region, or base layer, 46b.

Electrical contacts 52a, 52b are used to couple the modulated carrier signal into the emitter. An example of a driver circuit for the emitter is described below.

Figure 4:
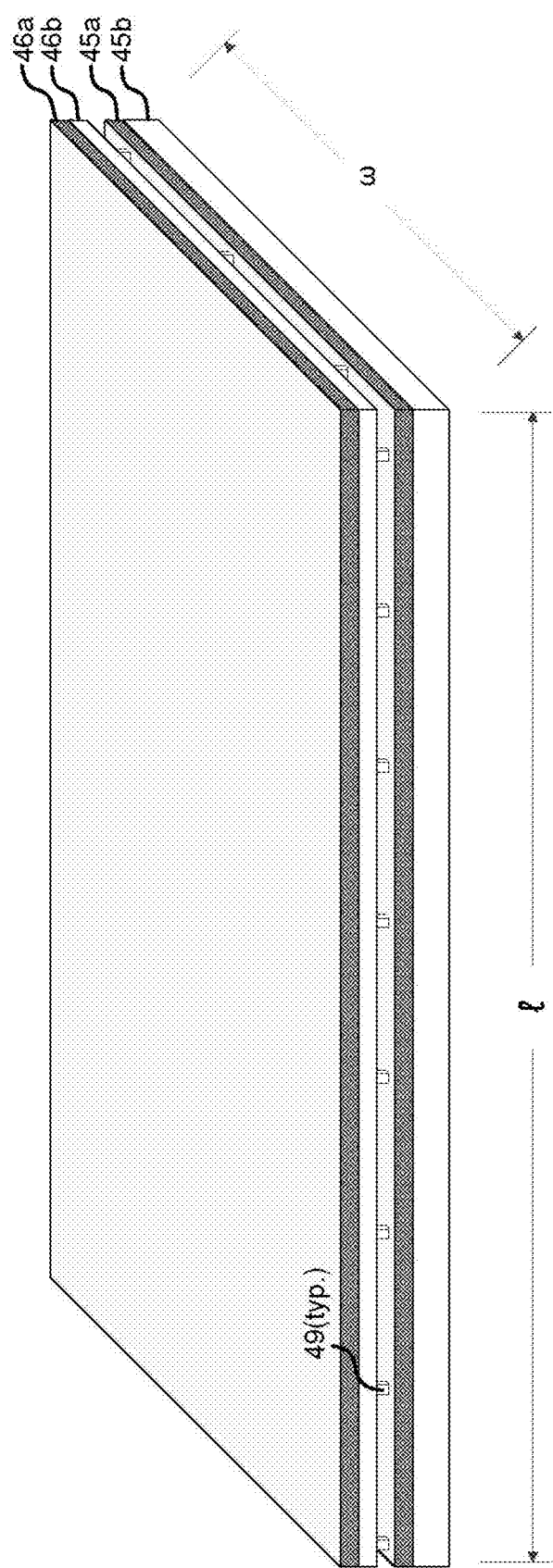
FIG. 4 is a diagram illustrating a cross sectional view of an assembled emitter in accordance with the example illustrated in FIG. 3A.

FIG. 4 is a diagram illustrating a cross sectional view of an assembled emitter in accordance with the example illustrated in FIG. 3A. As illustrated, this embodiment includes conductive sheet 45, conductive sheet 46 and spacers 49 disposed between conductive sheets 45, 46.

Figure 5:
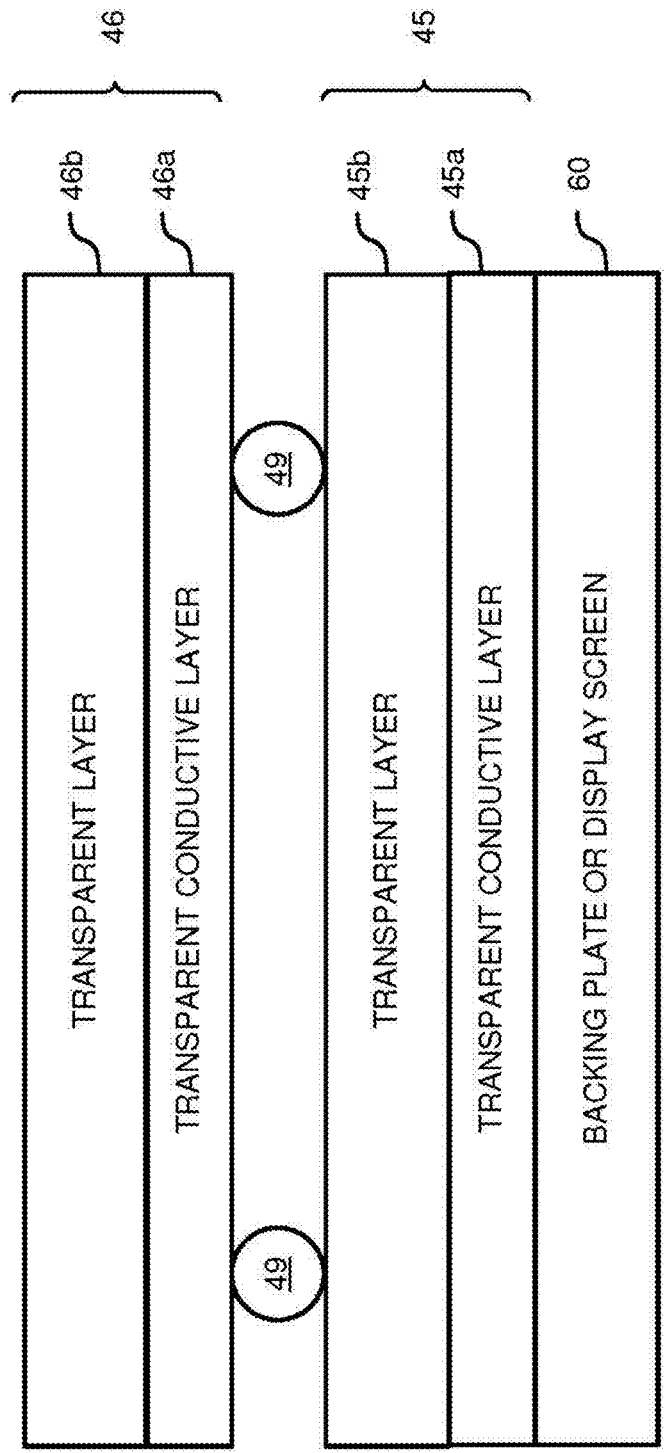
FIG. 5 is a diagram illustrating a further embodiment of a transparent parametric emitter.
Figure 6:
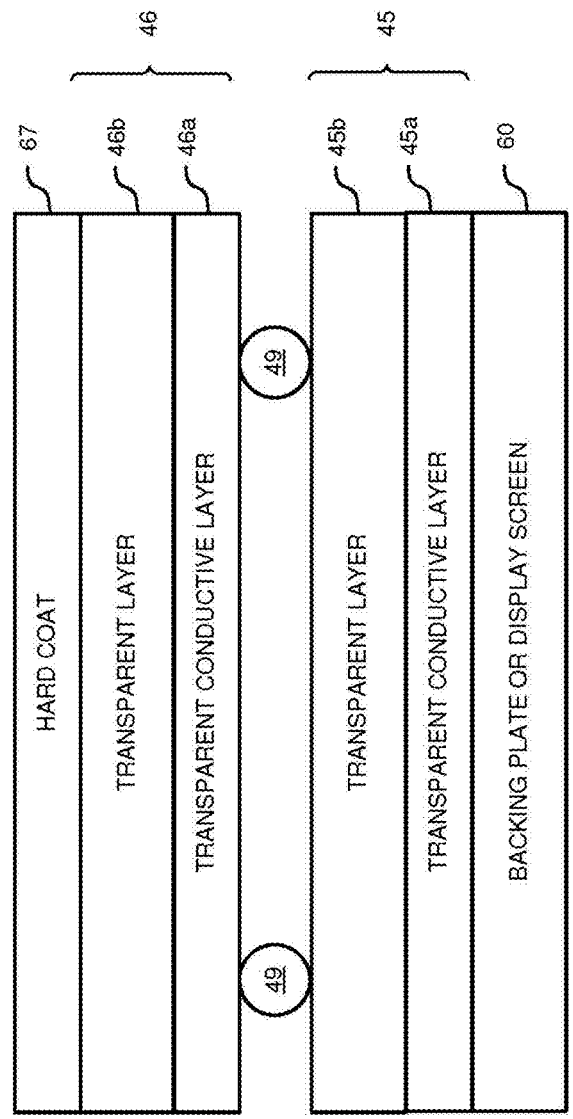
FIG. 6 is a diagram illustrating another embodiment of a transparent parametric emitter.
Figure 7:
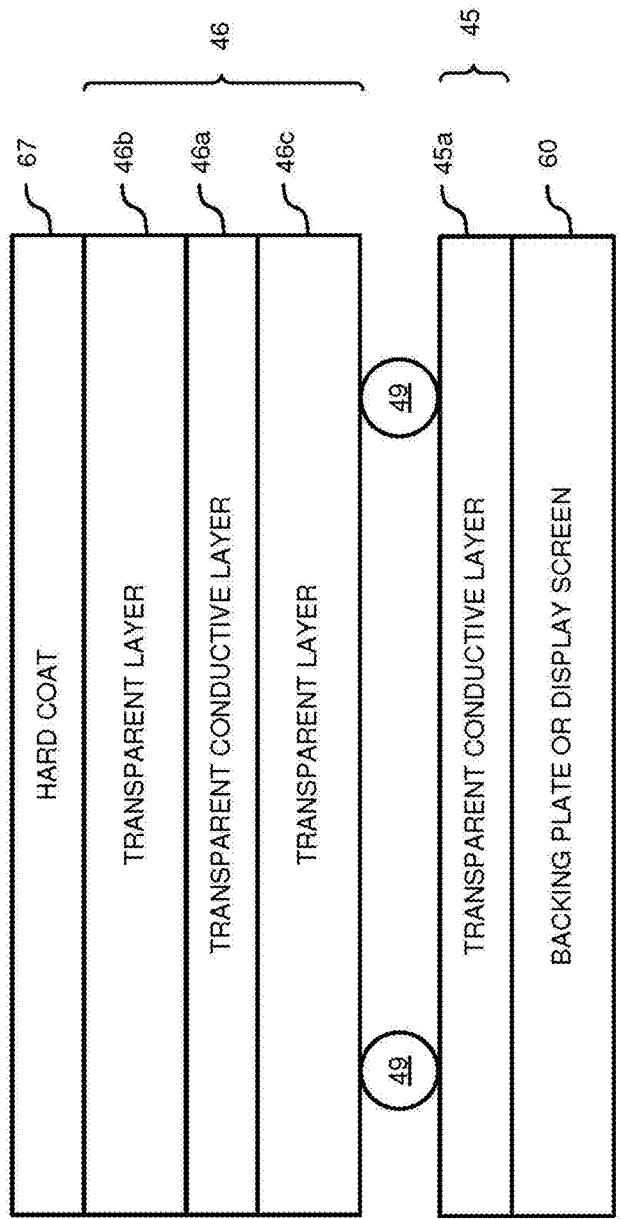
FIG. 7 is a diagram illustrating yet another embodiment of a transparent parametric emitter.

In further embodiments of the disclosed technology, the various layers of sheet 45 and sheet 46 can be arranged in alternative configurations from those shown above. FIGS. 5-7 illustrate various further embodiments of a transparent parametric emitter. Referring first to FIG. 5, the example emitter includes four layers: a transparent conductive layer 46a, a transparent nonconductive layer 46b, a transparent conductive layer 45a, and a transparent nonconductive layer 45b. The example emitter also includes a plurality of spacers 49, preferably implemented as transparent beads or dots, which provide spacing between conductive layer 46 and conductive layer 45.

In various embodiments, the spacing and spatial volume between the layers can be chosen to tune or adjust the resonant frequency of the emitter and to allow conductive layer 46 to vibrate to generate and launch the modulated ultrasonic signal into the transmission medium (e.g., into the air). In some embodiments, conductive layer 46 (e.g., a conductive film) is positioned as close to conductive layer 45 as possible (for example, as close as can be obtained without arcing between the layers) and the resonant frequency of the emitter is tuned by adjusting the thickness of conductive layer 46.

As with the embodiments described above, transparent base layers 45b, 46b can comprise any of a number of different transparent materials including, for example, glasses, Plexiglas, plastics, PETs, Mylar, Kapton and other like materials. Transparent layer 45b could also comprise the outermost layer of an LCD (or other display), such as, for example, a polarizer, outer glass, or other outer layer, or it can be mounted to the outermost layer of a display. In the diagram illustrated in FIG. 5, the example emitter is illustrated as being mounted to a display screen 60 of a content display device.

Transparent layer 46b can be any thickness as may be appropriate for the given application. For example, in some embodiments, transparent layer 46b can have a thickness in the range of 25 to 50 microns. In other embodiments, transparent layer 46b may be as thin as 10 to 12 microns, for example, while in other embodiments it can be as thick as 350 microns, for example. Because layer 46 is intended to vibrate to generate the ultrasonic wave launched into the air, it is preferable that layer 46, and therefore transparent layer 46b, be thin enough to allow such vibration. Because the transparent conductive layer 46a may be relatively thin, transparent layer 46b can, in various embodiments, provide support to conductive layer 46a, and its thickness adjusted accordingly. In some applications, thicknesses significantly greater than 50 microns overall may lead to an undesirably low operating efficiency, which one of ordinary skill in the art will understand can be overcome with the addition of more power.

In various embodiments as described above, conductive layers 45a, 46a comprise a thin layer of conductive material deposited, laminated or otherwise disposed on their transparent base layers 45b, 46b.

In various embodiments, layers 45b and 49 are configured to have a certain resistivity and breakdown voltage, to provide sufficient insulation between conductive layers 46a and 45a. The resistivity of the materials in layers 45b and 49 is preferably ≥1000 ohm*cm, and they preferably have a breakdown voltage ≥100 V/mil, although other values can be used. As noted above, it is desired to prevent shorting between conductive layers 46a and 45a. Therefore, the layer resistivity and breakdown voltage parameters may be chosen with this goal in mind. Higher resistivity may be desirable, for example, as this allows closer placement of conductive layers 46a and 45a, which provides operation that is more efficient. In addition to providing electrical insulation, layer 45b can be of a suitable thickness and index of refraction so as to provide index matching and/or anti-reflective properties, which may increase the light transmission through the emitter.

The example of FIG. 5 also includes a plurality of dots or spacers 49 disposed between layers 45 and 46. As noted above with reference to FIG. 4, the spacers 49 can be implemented as beads of glass, plastic, polymer, or other transparent material. Spacers 49 are preferably less than 50 microns in diameter and in some embodiments can be as small as 8 to 12μ. Indeed, in further embodiments, spacers 49 can be smaller. Preferably, spacers are large enough to provide an adequate spacing between layers 45 and 46, yet small enough to minimize or reduce interference with the transparency of the device. With a closer spacing between layers 45 and 46, generally less voltage is needed to drive the emitter for a given output, and the resonant frequency of the system increases with all other variables remaining the same. It is further noted that smaller spacers may be preferable because a smaller footprint of spacers 49 in contact with layer 46 will typically reduce the damping effect that spacers 49 may have on the output of the emitter.

Spacers 49 can be patterned onto layer 45 or 46 in any of a number of patterns or shapes. For example, spacers 49 can be patterned as bumps, dots, or other like discrete structures arranged in a pattern such as in a square lattice or other pattern. Spacing between the spacers 49 can be determined by balancing the trade-offs between providing sufficient support for layer 46 against the goals of maintaining transparency of the emitter and providing a sufficient air gap to enable tuning the resonance of the emitter.

Figure 8:
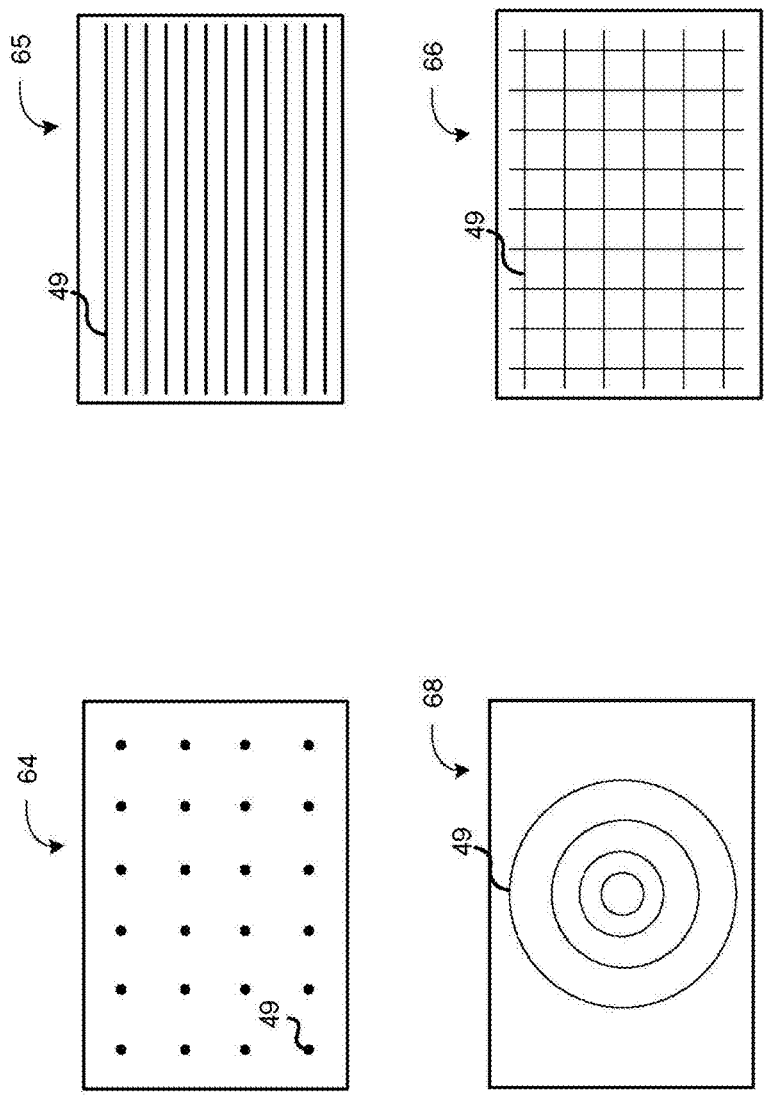
FIG. 8 is a diagram illustrating examples of spacer patterns in accordance with various embodiments of the technology described herein.

In some embodiments, spacers 49 are arranged in a square lattice pattern with a 1 mm pitch. Although spacers 49 are illustrated as spherical, they can take on any shape suitable for the application. Spacers 49 need not be configured as dots or beads, but can also be patterned as elongated spots, ridges, or other shapes and patterns that can be used to provide spacing between the layers 45, 46. FIG. 8 is a diagram illustrating an example of spacer patterns that can be used. As seen, in other embodiments, the spacers 49 can be patterned as dots arranged in a square lattice as shown at example 64. Spacers 49 can also be configured as a plurality of parallel ridges as shown at example 65, a plurality of ridges running cross-wise to one another as shown at example 66, and a plurality of ridges forming concentric rings as shown at example 68. As will be appreciated by one of ordinary skill in the art after reading this description spacers can be provided in any of a number of patterns and shapes to perform the desired function which can include, for example, maintaining an open volume between layers 45 and 46, adjusting a resonant frequency of the emitter, and allowing the vibrating surface of the emitter to vibrate.

Spacers 49 can be applied to either or both surfaces 45, 46 using any of a number of techniques. For example, spacers 49 can be printed (e.g., screen printed) onto a layer and hardened. The spacers can be hardened, for example, by freezing, curing, drying or other hardening techniques. In other embodiments, the spacers can be made by a sol-gel process, such as, for example, a process by which a solution such as $SiO_2$ is disposed on the desired surface in dots (or other shapes) and allowed to harden such as by drying, curing or firing. The sol-gel may be spin coated, patterned and cured into an appropriate dielectric. In still other embodiments, the spacers can be made by vacuum sputtering of an appropriate dielectric through a suitable mask. As a further example, UV curable or other curable inks can be used to form the spacers 49 via printing, and the printed pattern hardened through curing (e.g., by exposure to UV radiation). Likewise, heat-curable inks can be used as well. In yet another embodiment, glass beads can be used as spacers 49. For example, a pattern of electrostatic charges can be created on the layer to position the beads in place. Once in place, the beads can be affixed to the desired positions (e.g., by flash freezing or other techniques).

In some embodiments, a hard coat surface coating can be provided to protect the emitter from damage due to handling or other physical contact or from degradation or wear due to exposure to the environment. FIG. 6 is a diagram illustrating an example of the emitter shown in FIG. 5A, but with the addition of a hard coat coating. In the example illustrated in FIG. 6, the outer surface of the emitter (i.e., the surface facing the user, which may be referred to at times as a front surface) is coated with the hard coat 67. Preferably, the hard coat 67 is placed on the outer surface of the emitter to improve its durability and improve its resistance to scratches that could otherwise damage the conductive layer 46a or impair the transparency or appearance of the emitter. In some embodiments, the hard coat 67 can be a coating that is 3H or harder. In other embodiments, coatings of 1H or harder can be applied.

In various embodiments, the hardcoat is applied thick enough to impart additional hardness or durability to the layer, but not so thick that it adversely affects the resonant frequency of the device or the ability of the device to produce a signal at acceptable power levels. Such thicknesses may be, for example, from 10 to 20μ, however other thicknesses can be used. In some embodiments, such as where the layer is a film (for example, Mylar), it may be desirable to coat both sides of the film with hardcoat to avoid curling of the film.

In some embodiments, layer 46 is configured as the ground layer, and layer 45 as the high voltage layer. Such embodiments can be configured to be relatively user-safe if properly packaged given that the front face of the emitter is the face exposed to the user. In various embodiments, however, the hard coating is preferably capable of withstanding large electric fields to further insulate the system. Additionally, layer 45b may comprise a very hard material such as silicon dioxide or silicon nitride. In addition to being good insulators, these materials are also very hard. Therefore, the hardness of this material will reduce physical accessibility to the high voltage on layer 45.

FIG. 7 is a diagram illustrating yet another embodiment of a transparent emitter. In the example illustrated in FIG. 7, as compared to the embodiments in FIGS. 5A and 5B, there is no transparent layer 45b, and a transparent layer 46c is disposed adjacent transparent conductive layer 46a. Although not illustrated, in yet further embodiments, transparent layer 46c can be eliminated. However, there must be sufficient spacing between transparent conductive layer 46a and transparent conductive layer 45a to avoid shorting or arcing between the layers during operation.

The dimensions in these and other figures, and particularly the thicknesses of the layers and the spacing, are not drawn to scale. Conductive layers 45a, 46a are shown in FIGS. 3 & 4 as shaded. This is done solely to enhance visibility in the drawing. All of the layers can be transparent, or some of the layers can be shaded or tinted as desired. A layer of anti-reflective, anti-scratch (or both) coating (not shown) can be provided on the outer surface of the emitter to enhance visibility and durability of the emitter.

The emitter can be made to just about any dimension. In one application the emitter is of length, l, 3 inches and its width, ω, is 2 inches although other dimensions, both larger and smaller are possible. As another example, an emitter was created as a 6"×12" emitter and has an output of 81 dB at 1 kHz when being driven with 96 kHz carrier. An example emitter with a dot size of 9 micron and a 1 mm pitch with 30 micron film (layer 46) has resonance at approximately 100 kHz.

Greater emitter area can lead to a greater sound output, but will typically also require more power. In some embodiments, practical ranges of length and width can be similar lengths and widths of conventional bookshelf speakers. In embodiments where the emitter is used on or as the screen of a content device, the emitter can be sized to be accommodated on or by the casing of the content device or to be commensurate with the device display dimensions.

Sheets 45 and 46 (and insulating layer 47 when included) can be dimensioned to have a length and width desirable for a particular application. For example, where the emitter is used as a facing for a picture frame (e.g., in place of or on top of the picture frame glass), the dimensions of the emitter can be selected to conform to the dimensions of the picture frame. As another example, where a transparent emitter is configured for use as a screen or screen cover on a content device, sheets 45 and 46 (and insulating layer 47 when included) can be dimensioned to conform to the form factor of the content device with which it is used. Large emitters can be made for applications in the television or home theater segment, having a diagonal measurement such as, for example, 36", 50", 55", 60", 65", 70", 80", or 90 inches (or greater), to name a few, with an aspect ratio to match that of the device. For smaller devices such as smart phones, for example, sizes or the order of 3"×2" can be used. In some embodiments, insulating layer 47 can have a larger length and width as compared to sheets 45 and 46 to provide insulation at the edges of the emitter and prevent edge arcing between sheets 45 and 46.

Parametric emitters typically have a natural resonant frequency at which they will resonate. For transparent emitters such as those described herein, their natural resonant frequency can be in the range of approximately 30-100 kHz. For example, 80 kHz. Accordingly, the emitter materials and the carrier frequency of the ultrasonic carrier can be chosen such that the carrier frequency matches the resonant frequency of the emitter. The carrier frequency can be the same as or substantially the same as the resonant frequency of the emitter. In some embodiments, the carrier frequency can be within, for example +/−5%, 10% or 15% of the resonant frequency of the emitter. Selecting a carrier frequency at or near the resonant frequency of the emitter can increase the output of the emitter.

The embodiments disclosed above described contacts on conductive layers 45, 46. In some embodiments, a long, thin contact along one or more edges of the conductive layers 45a, 46a of conductive layers 45, 46 can be used to couple the signals on to the emitter. The use of a highly conductive (e.g., silver, copper, gold, etc.) bus bar across one or more than one side of the emitter would improve the emitter from an RC time constant perspective, as that would allow the applied voltage to be essentially applied uniformly or substantially uniformly from all sides of the emitter, reducing the longest path that current must travel within the transparent conductive layer. The use of highly conductive silver bus bars is not uncommon in applications for touchscreen displays, and these bus bars may be hidden from the user by the display bezel, which can be an opaque plastic, or an opaque paint. Bus bars can be applied by several different methods including printing (e.g., screen printing or stencil printing) and photolithography. It should be noted that, as the emitters get larger, the capacitance of the emitter will increase, thus requiring a lower resistance.

Although not illustrated, the emitter can also include a mounting assembly such as, for example, ultrahigh bond (UHB) or very high bond (VHB) tape or glue, although other adhesives or mounting mechanisms can be provided. Preferably, the mounting assembly is disposed about the periphery of display screen 60 such that it does not interfere with the transparency of the emitter. In some embodiments, transparent adhesives can be used and can be applied to bond the transparent base layer 45b to display screen 60 about the periphery and in other areas as well.

In further embodiments, the transparent emitter can be adhered to the display screen 60 of the content device using for example, optically transparent adhesive. Ideally, optically transparent adhesive has a high degree of transparency such as, for example, greater than 70%. Optically clear or transparent adhesive can be applied in a thin film across the entire area of the joined surfaces, or it can be laid down in a pattern on either or both surfaces before they are joined.

In still further embodiments, layer 60 could be a backing plate, and the emitter installed on or close to (but not touching) the display. Backing plate 60 could be bonded or attached to the display screen using, for example, tape or glue along its edges, mechanical fasteners, or optically transparent adhesives.

In various embodiments, the front film can itself comprise a thin layer of transparent conductive material such as graphene, without requiring support from a base layer. In other words, in some embodiments, conductive layer 46a can be implemented without base layer 46b. Therefore, in some embodiments, conductive layer 46 may be implemented as a thin layer of graphene, or a thin composite of plastic and graphene.

Figure 9:
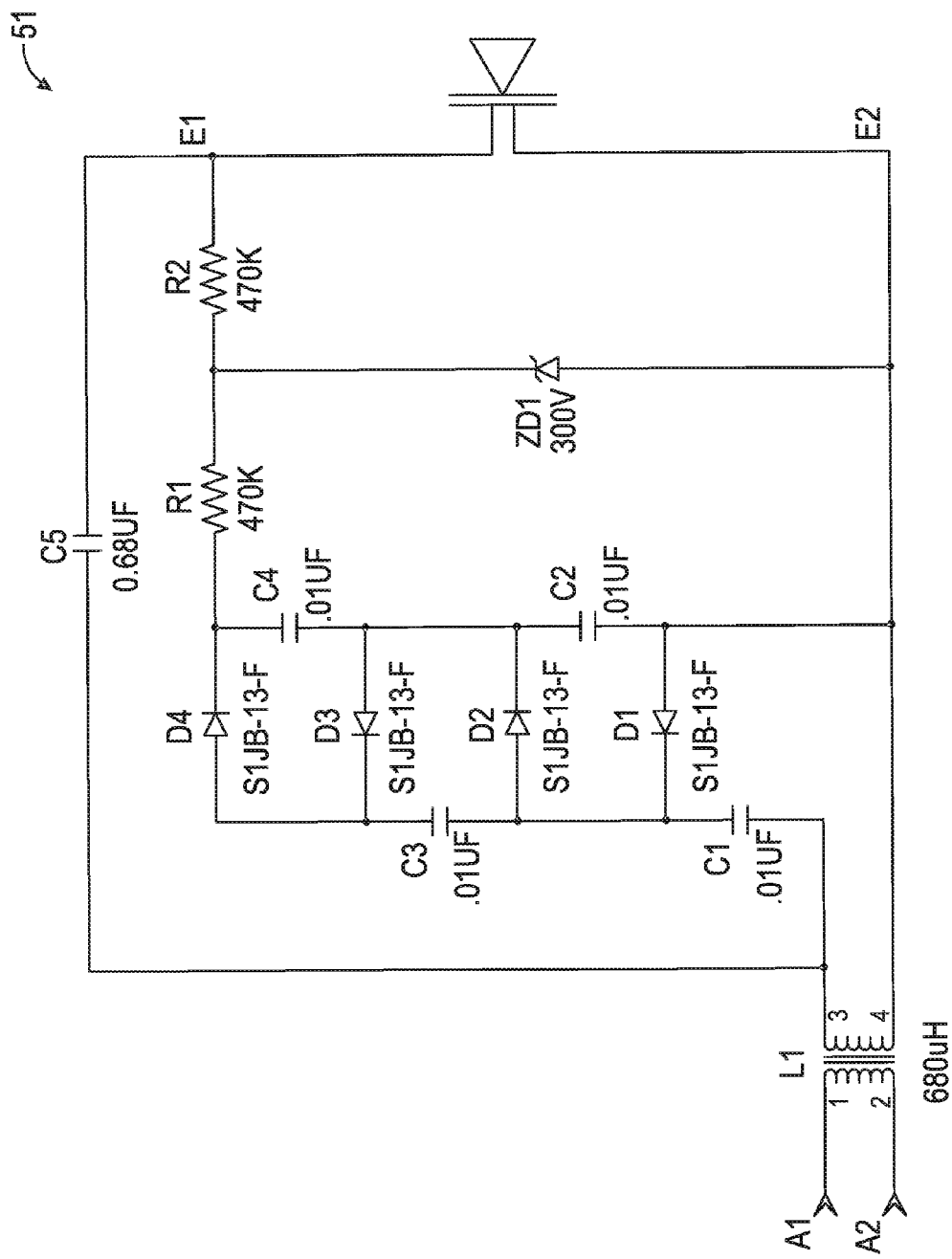
FIG. 9 is a diagram illustrating another example of a simple driver circuit that can be used to drive the emitters disclosed herein.

FIG. 9 is a diagram illustrating an example of a simple driver circuit that can be used to drive the emitters disclosed herein. As would be appreciated by one of ordinary skill in the art, where multiple emitters are used (e.g., for stereo applications), a driver circuit 51 can be provided for each emitter. In some embodiments, the driver circuit 51 is provided in the same housing or assembly as the emitter. In other embodiments, the driver circuit 51 is provided in a separate housing. This driver circuit is only an example, and one of ordinary skill in the art will appreciate that other driver circuits can be used with the emitter technology described herein.

Typically, the modulated signal from the signal processing system is electronically coupled to an amplifier (not shown). The amplifier can be part of, and in the same housing or enclosure as driver circuit 51. Alternatively, the amplifier can be separately housed. After amplification, the signal is delivered to inputs A1, A2 of driver circuit 51. In the embodiments described herein, the emitter assembly includes an emitter that can be operable at ultrasonic frequencies. The emitter is connected to driver circuit 51 at contacts E1, E2. An advantage of the circuit shown in FIG. 9 is that the bias can be generated from the ultrasonic carrier signal, and a separate bias supply is not required. In operation, diodes D1-D4 in combination with capacitors C1-C4 are configured to operate as rectifier and voltage multiplier. Particularly, diodes D1-D4 and capacitors C1-C4 are configured as a rectifier and voltage quadrupler resulting in a DC bias voltage of up to approximately four times the carrier voltage amplitude across nodes E1, E2. Other levels of voltage multiplication can be provided using similar, known voltage multiplication techniques.

Capacitor C5 is chosen large enough to hold the bias and present an open circuit to the DC voltage at E1 (i.e., to prevent the DC from shorting to ground), but small enough to allow the modulated ultrasonic carrier pass to the emitter. Resistors R1, R2 form a voltage divider, and in combination with Zener diode ZD1, limit the bias voltage to the desired level, which in the illustrated example is 300 Volts.

Inductor can be of a variety of types known to those of ordinary skill in the art. However, inductors generate a magnetic field that can "leak" beyond the confines of the inductor. This field can interfere with the operation and/or response of the emitter. Also, many inductor/emitter pairs used in ultrasonic sound applications operate at voltages that generate large amounts of thermal energy. Heat can also negatively affect the performance of a parametric emitter.

For at least these reasons, in most conventional parametric sound systems the inductor is physically located a considerable distance from the emitter. While this solution addresses the issues outlined above, it adds another complication. The signal carried from the inductor to the emitter is can be a relatively high voltage (on the order of 160 V peak-to-peak or higher). As such, the wiring connecting the inductor to the emitter must be rated for high voltage applications. Also, long runs of the wiring may be necessary in certain installations, which can be both expensive and dangerous, and can also interfere with communication systems not related to the parametric emitter system.

Figure 10:
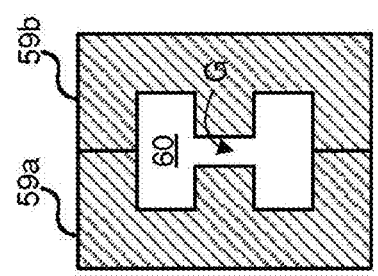
FIG. 10 is a diagram illustrating a cutaway view of an example of a pot core that can be used to form a pot-core inductor.

The inductor (including as a component as shown in the configuration of FIG. 9) can be implemented using a pot core inductor. A pot core inductor is housed within a pot core that is typically formed of a ferrite material. This confines the inductor windings and the magnetic field generated by the inductor. Typically, the pot core includes two ferrite halves 59*a*, 59*b* that define a cavity 61 within which the windings of the inductor can be disposed. See FIG. 10. An air gap G can be included to increase the permeability of the pot core without affecting the shielding capability of the core. Thus, by increasing the size of the air gap G, the permeability of the pot core is increased. However, increasing the air gap G also requires an increase in the number of turns in the inductor(s) held within the pot core in order to achieve a desired amount of inductance. Thus, an air gap can increase permeability and at the same time reduce heat generated by the pot core inductor, without compromising the shielding properties of the core.

In the example illustrated in FIG. 9, a dual-winding step-up transformer is used. However, the primary and secondary windings can be combined in what is commonly referred to as an autotransformer configuration. Either or both the primary and secondary windings can be contained within the pot core.

As discussed above, it is desirable to achieve a parallel resonant circuit with inductor and the emitter. It is also desirable to match the impedance of the inductor/emitter pair with the impedance expected by the amplifier. This generally requires increasing the impedance of the inductor emitter pair. It may also be desirable to achieve these objectives while locating the inductor physically near the emitter. Therefore, in some embodiments, the air gap of the pot core is selected such that the number of turns in the primary winding present the impedance load expected by the amplifier. In this way, each loop of the circuit can be tuned to operate at an increased efficiency level. Increasing the air gap in the pot core provides the ability to increase the number of turns in primary winding without changing the desired inductance of inductor element (which would otherwise affect the resonance in the emitter loop). This, in turn, provides the ability to adjust the number of turns in primary winding to match the impedance load expected by the amplifier.

An additional benefit of increasing the size of the air gap is that the physical size of the pot core can be reduced. Accordingly, a smaller pot core transformer can be used while still providing the same inductance to create resonance with the emitter.

The use of a step-up transformer provides additional advantages to the present system. Because the transformer "steps-up" from the direction of the amplifier to the emitter, it necessarily "steps-down" from the direction of the emitter to the amplifier. Thus, any negative feedback that might otherwise travel from the inductor/emitter pair to the amplifier is reduced by the step-down process, thus minimizing the effect of any such event on the amplifier and the system in general (in particular, changes in the inductor/emitter pair that might affect the impedance load experienced by the amplifier are reduced).

In one embodiment, 30/46 enameled Litz wire is used for the primary and secondary windings. Litz wire comprises many thin wire strands, individually insulated and twisted or woven together. Litz wire uses a plurality of thin, individually insulated conductors in parallel. The diameter of the individual conductors is chosen to be less than a skin-depth at the operating frequency, so that the strands do not suffer an appreciable skin effect loss. Accordingly, Litz wire can allow better performance at higher frequencies.

Although not shown in the figures, where the bias voltage is high enough, arcing can occur between conductive layers 45, 46. This arcing can occur through the intermediate insulating layers as well as at the edges of the emitter (around the outer edges of the insulating layers. Accordingly, the insulating layer 47 can be made larger in length and width than conductive layers 45*a*, 46*a*, to prevent edge arcing. Likewise, where conductive layer 46 is a metalized film on an insulating substrate, conductive layer 46 can be made larger in length and width than conductive layer 45, to increase the distance from the edges of conductive layer 46 to the edges of conductive layer 45.

Resistor R1 can be included to lower or flatten the Q factor of the resonant circuit. Resistor R1 is not needed in all cases and air as a load will naturally lower the Q. Likewise, thinner Litz wire in inductor 54 can also lower the Q so the peak is not overly sharp.

Figure 11:
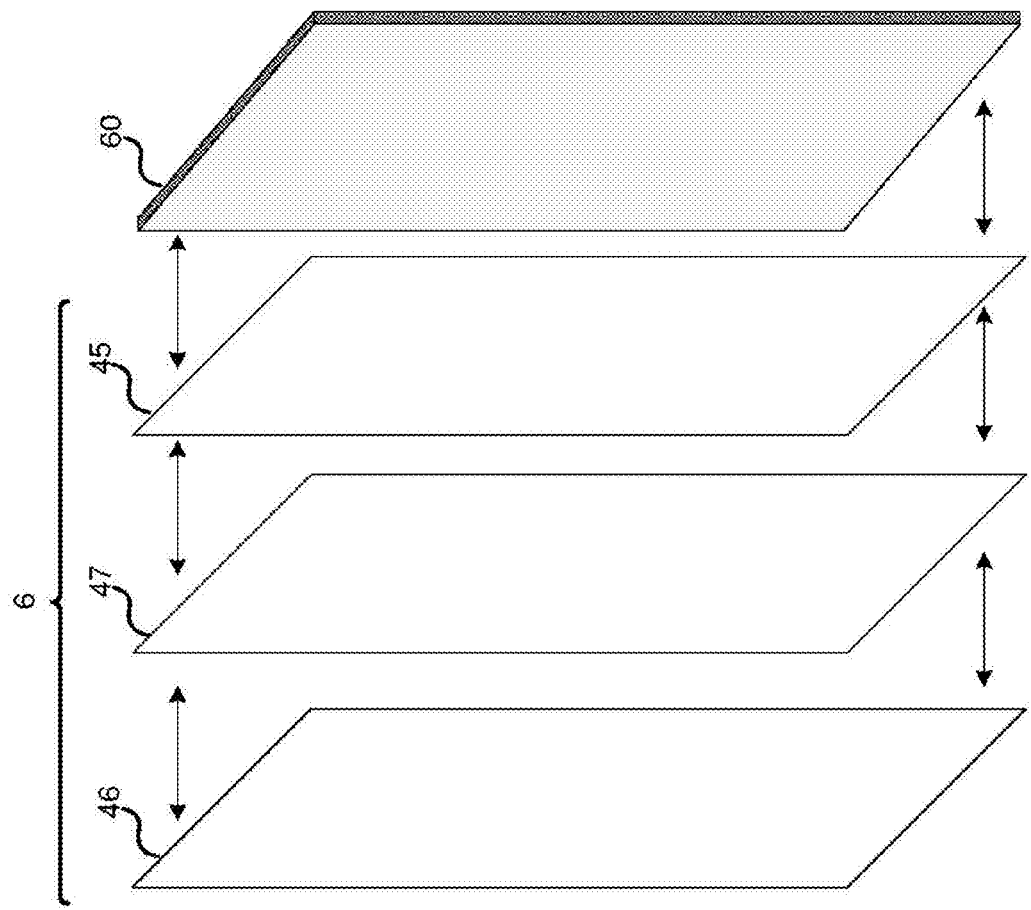
FIG. 11 is an exploded view diagram of an emitter and an accompanying content device with which it is incorporated in accordance with one embodiment of the technology described herein.

FIG. 11 is an exploded view diagram of an emitter and a screen of an accompanying content device with which it is incorporated in accordance with one embodiment of the technology described herein. Referring now to FIG. 11, the emitter 6 in this example includes conductive sheets 45, 46 and an insulating layer 47 therebetween. This emitter can be configured in accordance with the various embodiments as described in this document, including embodiments that do not include insulating layer 47, and including embodiments that use spacers 49. For example, conductive sheets 45, 46 can be transparent sheets and can each include two layers, a conductive layer 45a, 46a and a base layer 45b, 46b. These separate layers are not shown in FIG. 11 for ease of illustration.

Also shown in FIG. 11, is a display screen 60 to which the emitter is applied. Display screen 60 can be, for example, the display screen of a content device such as, for example, laptops, tablet computers, computers and other computing devices, smartphones, televisions, PDAs, mobile devices, mp3 and video players, digital cameras, navigation systems, kiosks, slot machines, point-of-sale terminals, or other content display devices. In various embodiments, the emitter 6 can be assembled with display screen 60 during device manufacture. In other embodiments, emitter 6 can be affixed to or joined with display screen 60 after the content device has been manufactured. For example, emitter 6 can be provided as an aftermarket product to be added to the content device by the user or retailer. It yet further embodiments, display screen 60 can be provided with a conductive region (e.g., coating) and be used as the base layer of the emitter, eliminating the need for layer 45.

The emitter can be larger or smaller than the actual display area, depending on the content device and application. For example, in some content devices, a transparent screen is provided to form a cover plate over both the display area and the border surrounding the display area. Accordingly, with such applications, the emitter can be sized to conform to the dimensions of the cover plate, thus providing a larger emitter area.

In yet further embodiments, content device display screen 60 can be made using a conductive glass (or other transparent material) and display screen 60 can be used as the conductive sheet 45. More particularly, in some embodiments, display screen 60 is used as base layer 45b to which a conductive layer 45a is applied. In such embodiments, display screen 60 can be manufactured to include an appropriate terminal or contact point by which a signal lead can be attached to display screen 60. In still further embodiments, the emitter can be configured to be flexible enough to be implemented with a touch-screen content device. For example, where display screen 60 is a touchscreen, emitter 6 can be made using sufficiently flexible materials to allow a user to operate the touchscreen display underlying the emitter.

In further embodiments, the transparent emitter can be implemented as a touch screen display. For example, in embodiments in which acoustic pulse recognition technology is used to implement the emitter/display, a touch sensor module can be included to sense wave patterns in the display based on the position at which a user touches the display. The touch sensor module can include appropriate signal processing circuitry/algorithms to subtract vibrations due to the known modulated ultrasonic carrier from the sensed vibrations to determine a position on the display touched by the user. Similarly, for surface acoustic wave technology, the touch sensor module can include appropriate signal processing circuitry/algorithms to subtract effects of audio modulation on the ultrasonic carrier from the received signal to determine a position on the display touched by the user. As a final example, with capacitive touchscreen displays, a touch sensor module can be included and configured to subtract any effect on the capacitance of the emitter/display caused by the modulated ultrasonic signal from received signals to arrive at the capacitance changes caused by an operator touching the display.

Figure 12A:
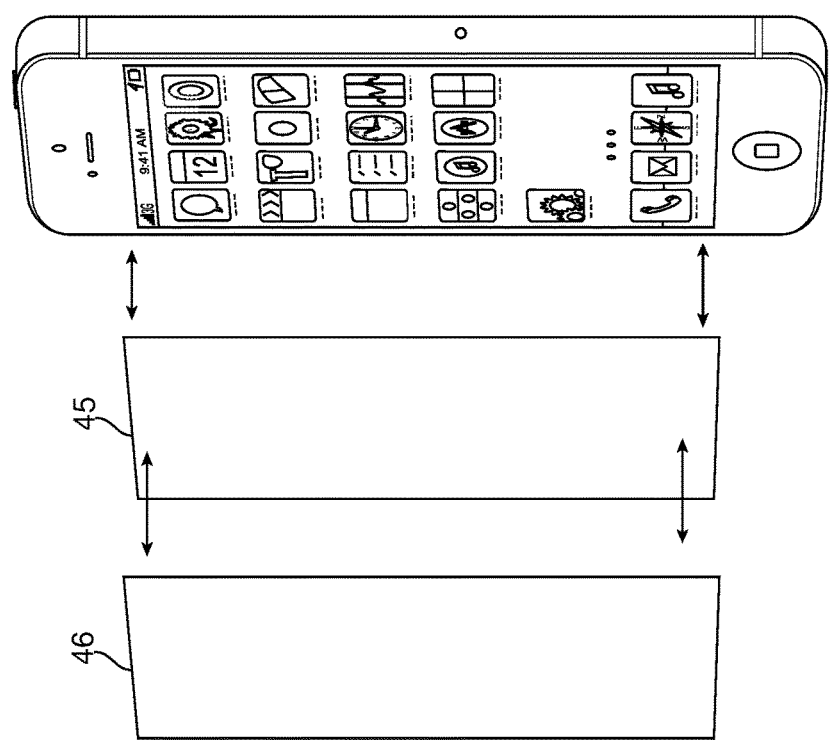
FIG. 12A is a diagram illustrating an example of an emitter (e.g., emitter 6) applied to the screen of a smart phone.

As described above, the emitters disclosed herein can be configured to be implemented with any of a number of different content devices. FIG. 12A is a diagram illustrating an example of an emitter (e.g., emitter 6) applied to the screen of a smart phone. In such an embodiment, the emitter can be used to play music and other media audio as well as to play ring tones, alarms, and other alerts generated by the smart phone and its associated applications. As with other devices, the emitter 6 can be used in addition to, or in place of, conventional audio speakers.

FIG. 12B is a diagram illustrating an example of an emitter (e.g., emitter 6) applied to the screen of a flat screen television. In such embodiments, the emitter can be configured to play content audio (e.g. television audio) to the television viewers. FIG. 12C is a diagram illustrating an example of an emitter (e.g., emitter 6) applied to the screen of a portable GPS device. In such applications, the emitter can be configured to play alerts and alarms the user as well as to provide audible turn-by-turn or other like instructions. Of course, where music or other content is available on the portable GPS device, emitter can be configured to play that information to the user as well.

Figure 12D:
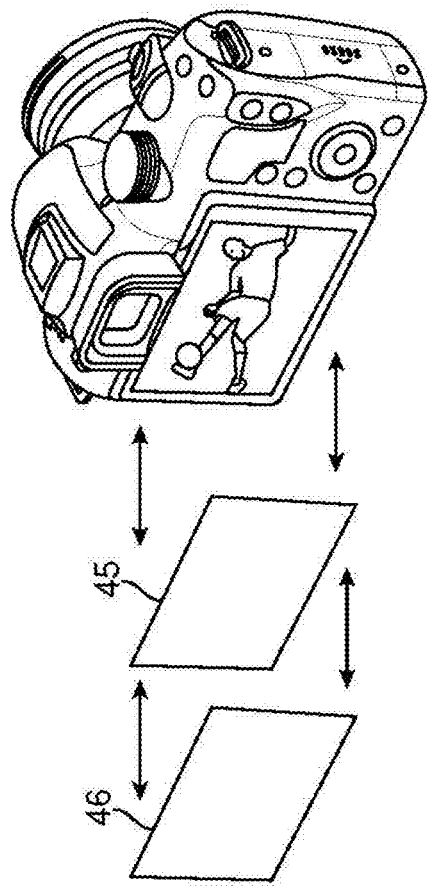
FIG. 12D is a diagram illustrating an example of an emitter (e.g., emitter 6) applied to the screen of a digital camera.
Figure 12E:
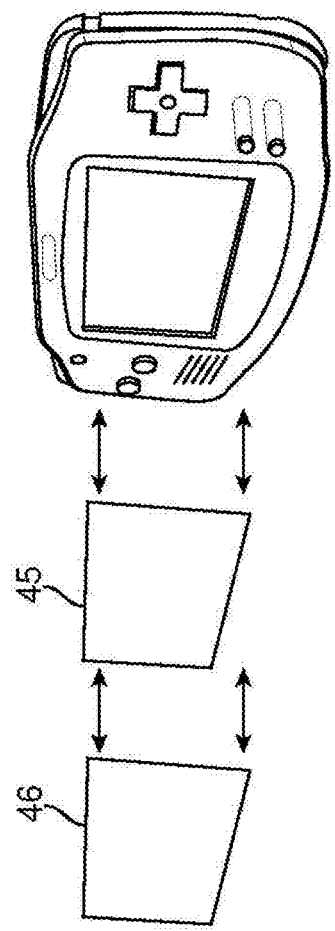
FIG. 12E is a diagram illustrating an example of an emitter (e.g., emitter 6) applied to the screen of a handheld gaming device.

FIG. 12C is a diagram illustrating an example of an emitter (e.g., emitter 6) applied to the screen of a portable navigation device. In such embodiments, the emitter can be configured to play back navigational directions and other sounds (e.g., turn by turn directions, chimes, alerts, low battery messages, and so on). FIG. 12D is a diagram illustrating an example of an emitter (e.g., emitter 6) applied to the screen of a digital camera. In such embodiments, the emitter can be configured to play back camera alerts and sounds (e.g., menu confirmations, simulated shutter sound effects, low battery messages, and so on). FIG. 12E is a diagram illustrating an example of an emitter (e.g., emitter 6) applied to the screen of a handheld gaming device. In such embodiments, the emitter can be configured to play gaming sounds to the user (e.g. game audio soundtracks, game sound effects, audible instructions, and so on) as well as gaming system alerts and messages.

Content devices, including those depicted in FIGS. 12A-12E can be configured to include one or more power supplies to supply power to the device and a content engine coupled to receive power from the power supply and to generate electrical signals representing audio content and electrical signals representing display content. For example, in the case of a smartphone, the power supply is typically in the form of a rechargeable battery and the content engine comprises a processor configured to execute one or more applications such as, for example, media player applications, gaming applications, telephone and directory applications, and so on. RAM, ROM and other memory can be included to store applications, application content (e.g., audio and video files), program instructions and so on. One such example processor is the Snapdragon™ family of processors available from Qualcomm, Inc.

The content display device typically also includes a display such as, for example, a plasma, LCD, LED, OLED or other display. The display can include a conventional screen or a touch-sensitive screen to accept user input and can provide color still and motion video content to the user. The display can be coupled to the content engine and configured to receive the electrical signals representing display content and to generate a visual representation of the display content. Continuing with the example of a smartphone, the display can display application visual information such as, for example, entry screens, video content, gaming screens, and so on. A protective cover can be included on the display and can be made from glass, acrylic, Plexiglas, Lexan or other transparent material. The transparent emitter can be disposed on the protective cover, for example, as an overlay on the protective cover. Alternatively, the emitter can be provided in place of the protective cover, or in place of the screen itself.

In these and other applications, the ultrasonic emitters can be configured to take advantage of the directional nature of ultrasonic signals, and can be configured to direct the ultrasonic audio content to an intended listener or user of the device. Accordingly, the device can be used in crowded or other public places with discretion. Emitters can also be shaped or configured to present a broader, less directional, sound to the listeners. This can be accomplished, for example, using a convex or multi-angled display.

Figure 13:
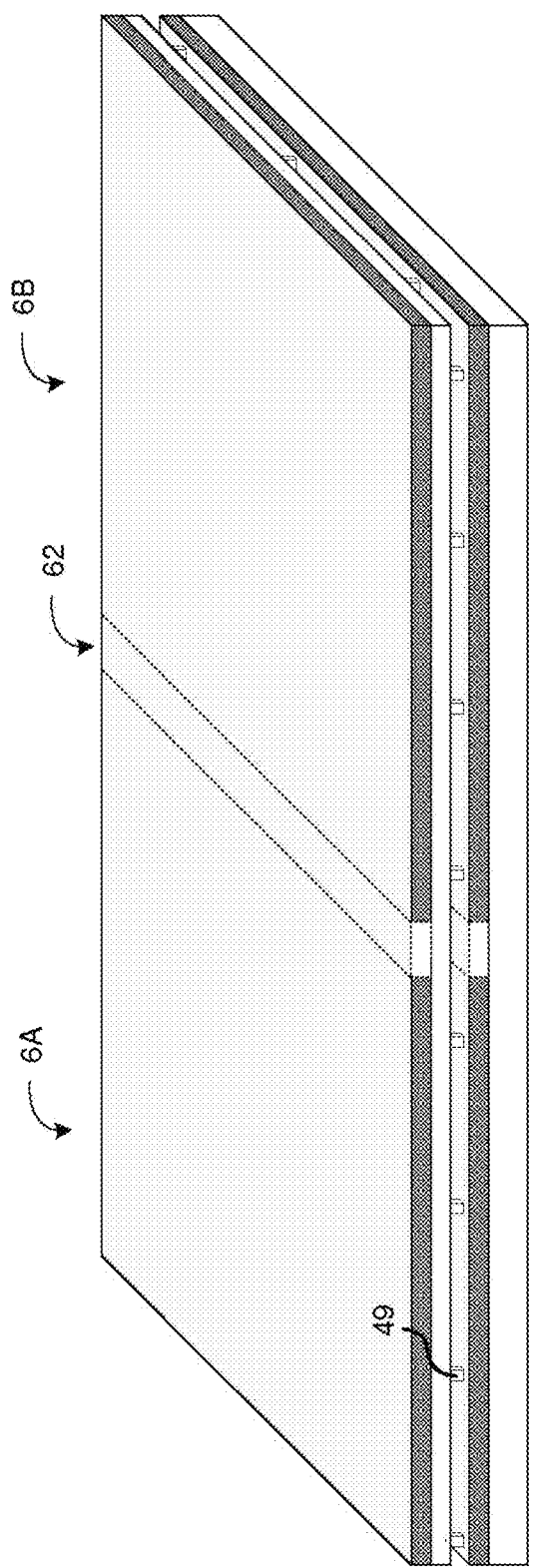
FIG. 13 is a diagram illustrating one example configuration of a dual-channel emitter configured to provide ultrasonic carrier audio for two audio channels.

In the embodiments described above, the emitter is depicted and described as providing ultrasonic-carrier audio signals for a single channel of audio. In other embodiments, the emitter can be configured to handle multiple audio channels. For example, in one embodiment, two separate emitters, each configured to be connected to an audio channel (e.g., a left and right audio channel) can be provided. FIG. 13 is a diagram illustrating one example configuration of a dual-channel emitter configured to provide ultrasonic carrier audio for two audio channels. In the example shown in FIG. 13, a left emitter 6A and a right emitter 6B are provided and separated by insulating barrier 62. Insulating barrier 62 provides a nonconductive region between the left and right emitters, electrically separating the left and right emitters so that the carriers injected on each emitter do not interfere with one another. In various embodiments, barrier 62 can be a non-conductive region of conductive layers 45a, 46a. In other embodiments, insulating region or barrier 62 can be a glass, acrylic, or other like insulating material positioned between the left and right emitters. Although two emitters 61A, 61B are illustrated in this example, one of ordinary skill in the art after reading this description will understand how more than two emitters can be created in a like fashion.

In other embodiments, rather than adding a physically separate insulating region between the 2 emitters, conductive sheets 45 and 46 can be manufactured with a nonconductive central region. For example, where doping or other like processes are used to impart conductivity to the conductive sheets, such doping or other process can be selectively applied to the sheets such that 2 or more conductive regions can be created in each conductive sheet.

To impart spatial characteristics to the audio signal, the emitters in such multi-emitter configurations can be positioned on a content device in such a way that they are oriented in different angles from one another to direct the audio-modulated ultrasonic carrier signal in different directions. Even for handheld content devices, only a small angle differential between the 2 emitters would be needed to direct one audio-modulated ultrasonic carrier signal to the listener's left ear and the other audio-modulated ultrasonic carrier signal to the listener's right ear.

In further embodiments, multiple non-conductive regions (e.g., like insulating barrier 62) can be used to divide the emitter into multiple segments and to configure the emitter as a phased array emitter. Particularly, the emitter can be configured as a single channel phased array or as a multichannel phased array. As a phased array configuration, the signal used to drive a given channel can be split into multiple paths and each path delayed in time and coupled to a segment such that the ultrasonic beam can be steered to an intended target. For example, the signals may be delayed so as to allow the emitted beam to be directed at the listener at a given location, or track the listener as he or she moves about the listening area. For example, for gaming applications, the phased array can be configured to track the gamer as he or she moves about listening area. Likewise, in a television environment, the phased array configuration can be used to steer the beam toward the listener as he or she moves about the viewing area.

For example, by increasing the amount of time delay introduced into a signal sent to the segments of the phased array emitter, the angle at which the audio-modulated ultrasonic signal is launched from the emitter may be increased in either direction, thereby steering the beam left or right. As another example, the delays may be configured to focus (narrow) the beam toward the center or to cause the beam to diverge (widen) as it travels away from the emitter. For instance, increasing the time delay from a center segment toward outer segments may cause the beam to diverge, while increasing the time delay from the outer segments toward the inner segments may focus the beam.

In embodiments, a device for determining a listener's distance relative to the emitter may be used in combination with the emitter. For example, an optical imaging system such as a digital camera and a depth sensor may be used to track the listener, including the listener's distance from the emitter and the listener's position relative to the emitter. In other examples, infrared, sonic, ultrasonic, radar, or other location sensors may be used to track a listener's position and determine the listener's distance.

In areas where there are multiple listeners, multiple phased arrays or phased arrays with time division multiplex to signals, can be used to direct different audio content to different listeners in the area. For example, the system can be configured to steer the content in different languages to different portions of the listening environment. As a further example, in a movie or auditorium seating sections can be broken up into different sections based on, for example, language, rating (e.g. G, PG, R, etc.) or other criteria in the appropriate content directed to those sections. Accordingly, people could choose to listen to the content in their own native language or with the appropriate rating based on where they sit in the auditorium.

The conductive and non-conductive layers that make up the various emitters disclosed herein can be made using flexible materials. For example, embodiments described herein use flexible metallized films to form conductive layers, and non-metalized films to form resistive layers. Because of the flexible nature of these materials, they can be molded to form desired configurations and shapes.

Figure 14B:
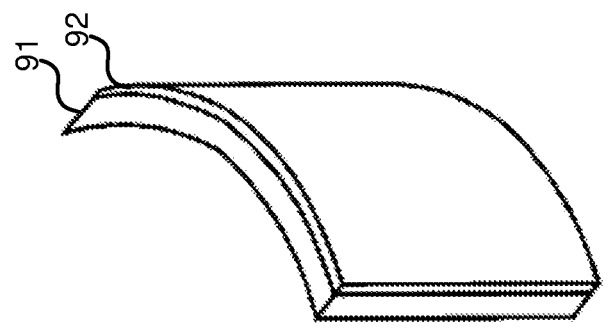
FIG. 14B illustrates a perspective view of an example of an emitter in an arcuate configuration.
Figure 14A:
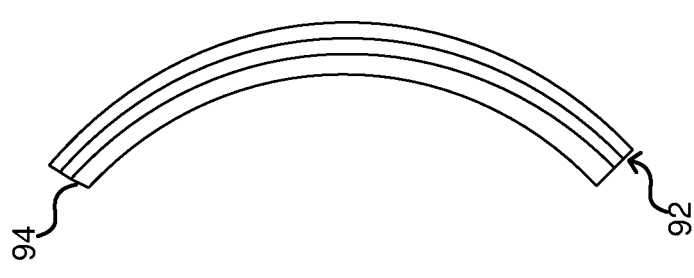
FIG. 14A illustrates an example of an emitter in an arcuate configuration.
Figure 15B:
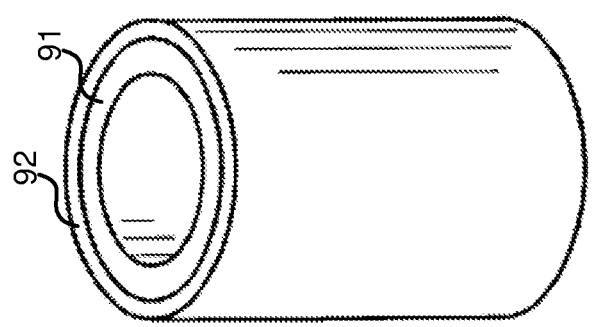
FIG. 15B illustrates a perspective view of an example of an emitter in a cylindrical configuration.
Figure 15A:
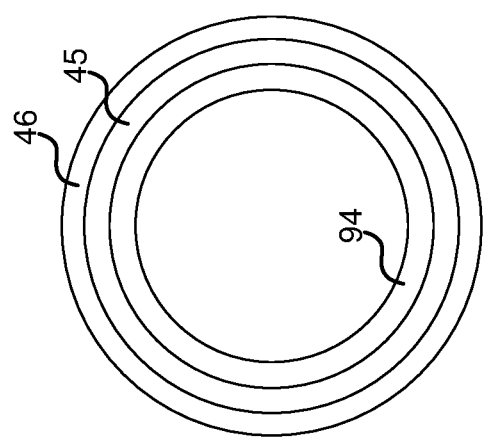
FIG. 15A illustrates an example of an emitter in a cylindrical configuration.

For example, as illustrated in FIG. 14A, the layers can be applied to a substrate 94 in an arcuate configuration. FIG. 14B provides a perspective view of an emitter formed in an arcuate configuration. In this example, a backing material 91 is molded or formed into an arcuate shape and the emitter layers 92 affixed thereto. Although one layer 92 is shown in FIGS. 14B, and 15B, layer 92 can comprise layers 45 and 46 and any spacers or insulators therebetween. Other examples include cylindrical (FIGS. 15A and 15B) and spherical, for example. As would be apparent to one of ordinary skill in the art after reading this description, other shapes of backing materials or substrates can be used on which to form ultrasonic emitters in accordance with the technology disclosed herein. Such curved emitters can be used in a number of applications including, for example, as curved displays on televisions and smartphones.

Conductive sheets 45, 46 can also be made using metalized films. These include, Mylar, Kapton and other like films. For example, in some embodiments, sheet 45 is made using a glass material and layer 46 is made using a metalized film such as mylar. Such metalized films are available in varying degrees of transparency from substantially fully transparent to opaque. Where oscillating layer (e.g., layer 46) is made using mylar or other like flexible film, it is ideally tensioned in both major dimensions so that it is capable of vibrating at carrier frequencies. Likewise, insulating layer 47 can be made using a transparent film. Accordingly, emitters disclosed herein can be made of transparent materials resulting in a transparent emitter. Such an emitter can be configured to be placed on various objects to form an ultrasonic speaker. For example, one or a pair (or more) of transparent emitters can be placed as a transparent film over a television screen. This can be advantageous because as televisions become thinner and thinner, there is less room available for large speakers. Layering the emitter(s) onto the television screen or other content or display device allows placement of speakers without requiring additional cabinet space. As another example, an emitter can be placed on a picture frame or electronic picture frame, converting a picture into an ultrasonic emitter. Also, because metalized films can also be highly reflective, the ultrasonic emitter can be made into a mirror.

The transparent emitter is also applicable to numerous other applications such as, for example, automobile mirrors or windows, dashboard panels, or other vehicle surfaces; doors and windows of appliances such as conventional ovens, microwave ovens, toaster ovens, dishwashers, refrigerators, etc.; kiosks and booths; desktop telephones; physical fitness or exercise equipment; display cases such as department store, supermarket, deli and other retail display cases; equipment screens on equipment such as oscilloscopes and other diagnostic or test equipment, medical devices, printers and faxes, and so on.

Because of the directional nature of ultrasonic transmissions, numerous devices so equipped may operate in proximity to one another, with their respective emitters directed at different listener positions, while not interfering with one another. Also, in various embodiments ultrasonic emitters can be used in combination with conventional audio speakers to allow the device to take advantage of the features of both ultrasonic audio (e.g., directionality) and conventional speakers (e.g., omnidirectionality). Switching can also be provided to allow the user or the system to select either the ultrasonic audio, the conventional audio or both.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A transparent ultrasonic audio speaker, comprising:
a first transparent conductive sheet;
a second transparent conductive sheet; and
a plurality of transparent spacers disposed between the first and second transparent conductive sheets of the transparent ultrasonic audio speaker, the transparent spacers having a thickness and being arranged to define an open area between the first and second transparent conductive sheets, wherein at least one of the first transparent conductive sheet and the second transparent conductive sheet are divided into a plurality of conductive regions by one or more nonconductive regions.

2. The transparent ultrasonic audio speaker of claim 1, wherein each of the plurality of conductive regions is connected to a respective audio channel.

3. The transparent ultrasonic audio speaker of claim 2, wherein the transparent ultrasonic audio speaker is a phased array emitter.

4. The transparent ultrasonic audio speaker of claim 1, wherein each of the plurality of conductive regions is connected to a respective path of an audio channel.

5. The transparent ultrasonic audio speaker of claim 4, wherein the transparent ultrasonic audio speaker is a phased array emitter.

6. The transparent ultrasonic audio speaker of claim 1, wherein each of the first transparent conductive sheet and the second transparent conductive sheet are divided into a plurality of conductive regions by one or more nonconductive regions.

7. The transparent ultrasonic audio speaker of claim 6, wherein the transparent ultrasonic audio speaker comprises first and second transparent ultrasonic audio emitters electrically separated by the one or more nonconductive regions, and wherein the first and second transparent ultrasonic audio emitters are oriented in different angles.

8. The transparent ultrasonic audio speaker of claim 1, wherein the one or more nonconductive regions comprise glass or acrylic.

9. The transparent ultrasonic audio speaker of claim 1, wherein the first transparent conductive sheet comprises a first transparent conductive layer adjacent a first transparent nonconductive layer and the second transparent conductive sheet comprises a second transparent conductive layer adjacent a second transparent nonconductive layer.

10. The transparent ultrasonic audio speaker of claim 9, further comprising a hard coat layer disposed on the first transparent non-conductive layer.

11. The transparent ultrasonic audio speaker of claim 1, wherein the first and second transparent conductive sheets and the transparent spacers as disposed between the two layers have a combined transmittance of greater than 75% in the visible spectrum.

12. An electronic content device, comprising:
a power supply;
a content engine coupled to receive power from the power supply and to generate electrical signals representing audio content and electrical signals representing display content;
a display coupled to the content engine and configured to receive the electrical signals representing display content and to generate a visual representation of the display content; and
a transparent ultrasonic audio speaker disposed on the display, the speaker comprising:
a first transparent conductive sheet;
a second transparent conductive sheet; and
a plurality of transparent spacers disposed between the first and second transparent conductive sheets of the transparent ultrasonic audio speaker, the transparent spacers having a thickness and being arranged to define an open area between the first and second transparent conductive sheets, wherein at least one of the first transparent conductive sheet and the second transparent conductive sheet are divided into a plurality of conductive regions by one or more nonconductive regions.

13. The electronic content device of claim 12, wherein each of the plurality of conductive regions is connected to a respective audio channel.

14. The electronic content device of claim 13, wherein the transparent ultrasonic audio speaker is a phased array emitter.

15. The electronic content device of claim 12, wherein each of the plurality of conductive regions is connected to a respective path of an audio channel.

16. The electronic content device of claim 15, wherein the transparent ultrasonic audio speaker is a phased array emitter.

17. The electronic content device of claim 12, wherein each of the first transparent conductive sheet and the second transparent conductive sheet are divided into a plurality of conductive regions by one or more nonconductive regions.

18. The electronic content device of claim 17, wherein the transparent ultrasonic audio speaker comprises first and second transparent ultrasonic audio emitters electrically separated by the one or more nonconductive regions, and wherein the first and second transparent ultrasonic audio emitters are oriented in different angles.

19. The electronic content device of claim 12, wherein the one or more nonconductive regions comprise glass or acrylic.

20. The electronic content device of claim 12, wherein the first transparent conductive sheet comprises a first transparent conductive layer adjacent a first transparent nonconductive layer and the second transparent conductive sheet comprises a second transparent conductive layer adjacent a second transparent nonconductive layer.

21. The electronic content device of claim 20, further comprising a hard coat layer disposed on the first transparent non-conductive layer.

22. The electronic content device of claim 12, wherein the first and second transparent conductive sheets and the transparent spacers as disposed between the two layers have a combined transmittance of greater than 75% in the visible spectrum.

23. The electronic content device of claim 12, further comprising:
a modulator coupled to receive the electrical signals representing audio content, and to modulate the received electrical signals onto an ultrasonic carrier; and
a driver circuit, comprising:
two inputs configured to be coupled to receive the electrical signals representing audio content modulated onto an ultrasonic carrier signal;
a first output coupled to the first transparent conductive sheet; and
a second output coupled to the second transparent conductive sheet.

24. The electronic content device of claim 12, wherein the electronic content device comprises a laptop, a tablet, a smartphone, a television, a digital camera, a navigation device, a gaming device, a point-of-sale terminal, a kiosk, or a slot machine.

* * * * *